(12) United States Patent
Wyndham et al.

(10) Patent No.: US 11,426,707 B2
(45) Date of Patent: Aug. 30, 2022

(54) COMPOSITE MATERIALS CONTAINING NANOPARTICLES AND THEIR USE IN CHROMATOGRAPHY

(71) Applicant: Waters Technologies Corporation, Milford, MA (US)

(72) Inventors: Kevin D. Wyndham, Upton, MA (US); Nicole L. Lawrence, Stafford Springs, CT (US)

(73) Assignee: Waters Technologies Corporation, Milford, MA (US)

( * ) Notice: Subject to any disclaimer, the term of this patent is extended or adjusted under 35 U.S.C. 154(b) by 1276 days.

(21) Appl. No.: 15/012,507

(22) Filed: Feb. 1, 2016

(65) Prior Publication Data

US 2016/0263555 A1    Sep. 15, 2016

Related U.S. Application Data

(63) Continuation of application No. 12/936,782, filed as application No. PCT/US2009/001893 on Mar. 27, 2009, now Pat. No. 9,248,383.

(Continued)

(51) Int. Cl.
*B01J 20/288* (2006.01)
*B01J 20/32* (2006.01)
(Continued)

(52) U.S. Cl.
CPC ............ *B01J 20/288* (2013.01); *B01D 15/08* (2013.01); *B01J 20/28042* (2013.01);
(Continued)

(58) Field of Classification Search
CPC .. B01J 20/288; B01J 20/2804; B01J 20/3204; B01J 20/3248; B01J 20/3255;
(Continued)

(56) References Cited

U.S. PATENT DOCUMENTS

| 4,017,528 A | 4/1977 | Unger et al. |
| 5,256,386 A | 10/1993 | Nystroem et al. |

(Continued)

FOREIGN PATENT DOCUMENTS

| EP | 1245276 A2 | 10/2002 |
| EP | 2008971 A1 | 12/2008 |

(Continued)

OTHER PUBLICATIONS

Yao et al. Characterization of a novel continuous supermacroporous monolithic cryogel embedded with nanoparticles for protein chromatography. Journal of Chromatography A, 1109 (2006) 103-110. (Year: 2006).*

(Continued)

*Primary Examiner* — Ryan B Huang
(74) *Attorney, Agent, or Firm* — Womble Bond Dickinson (US) LLP; Deborah M. Vernon

(57) ABSTRACT

Novel porous materials comprising nanoparticles, use in chromatographic separations, processes for its preparation, and separations devices containing the chromatographic material are described by the instant invention. In particular, the disclosure describes porous inorganic/organic hybrid particles embedded with nanoparticles selected from oxides or nitrides of the following: silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, and mixtures thereof.

22 Claims, 2 Drawing Sheets

Related U.S. Application Data

(60) Provisional application No. 61/043,230, filed on Apr. 8, 2008.

(51) Int. Cl.
  *B01J 20/28* (2006.01)
  *B01D 15/08* (2006.01)

(52) U.S. Cl.
  CPC ....... *B01J 20/3204* (2013.01); *B01J 20/3248* (2013.01); *B01J 20/3255* (2013.01); *B01J 20/3257* (2013.01); *B01J 20/3263* (2013.01); *B01J 2220/82* (2013.01)

(58) Field of Classification Search
  CPC .. B01J 20/3257; B01J 20/3263; B01J 20/284; B01J 20/285; B01J 20/3046; B01J 20/305; B01J 20/3085; B01J 20/3231; B01J 20/3217; B01J 20/10; B01J 20/02; B01J 20/22; B01J 20/26; B01J 20/265; B01J 20/264; B01J 2220/82; B01D 15/32; B01D 15/26; B01D 15/325
  See application file for complete search history.

(56) References Cited

U.S. PATENT DOCUMENTS

| | | | |
|---|---|---|---|
| 5,637,135 A * | 6/1997 | Ottenstein | B01J 20/285 55/524 |
| 5,856,379 A | 1/1999 | Shiratsuchi et al. | |
| 6,056,877 A * | 5/2000 | Gjerde | B01D 15/325 210/198.2 |
| 6,867,275 B2 | 3/2005 | Alexander, IV et al. | |
| 7,250,214 B2 | 7/2007 | Walter et al. | |
| 8,481,654 B2 | 7/2013 | Edelmann et al. | |
| 8,791,220 B2 | 7/2014 | Jiang et al. | |
| 2001/0033931 A1 * | 10/2001 | Jiang | B01J 20/103 428/402 |
| 2002/0192476 A1 | 12/2002 | Kambe et al. | |
| 2003/0150811 A1 * | 8/2003 | Walter | B01J 20/28033 210/656 |
| 2004/0035793 A1 * | 2/2004 | Legendre, Jr. | C12N 15/1006 210/656 |
| 2004/0118762 A1 * | 6/2004 | Xu | B01J 20/20 210/198.2 |
| 2005/0069718 A1 | 3/2005 | Voss-Kehl et al. | |
| 2005/0178730 A1 * | 8/2005 | Li | B01J 20/288 210/656 |
| 2005/0230298 A1 * | 10/2005 | Jiang | B01J 20/26 210/198.2 |
| 2006/0019084 A1 * | 1/2006 | Pearson | B01J 20/28007 428/304.4 |
| 2006/0057631 A1 | 3/2006 | Zou et al. | |
| 2006/0144770 A1 | 7/2006 | Granger et al. | |
| 2006/0204528 A1 | 9/2006 | Nolte et al. | |
| 2006/0219636 A1 * | 10/2006 | Plumb | B01J 20/262 210/656 |
| 2007/0003440 A1 | 1/2007 | McGill et al. | |
| 2007/0272309 A1 * | 11/2007 | Rehm | B01L 3/502738 137/528 |

FOREIGN PATENT DOCUMENTS

| | | |
|---|---|---|
| EP | 2048116 A1 | 4/2009 |
| JP | 2003080064 A | 3/2003 |
| JP | 2006043699 A | 2/2006 |
| JP | 2006504854 A | 2/2006 |
| JP | 2007507583 A | 3/2007 |
| JP | 2008508370 A | 3/2008 |
| WO | 2000/045951 A1 | 8/2000 |
| WO | WO-2004041398 A2 | 5/2004 |
| WO | WO-2005035238 A1 | 4/2005 |
| WO | WO-2006010388 A1 | 2/2006 |
| WO | 2006136534 A2 | 12/2006 |
| WO | 2007/122930 A1 | 11/2007 |

OTHER PUBLICATIONS

Castricum et al. Structure of hybrid organic-inorganic sols for the preparation of hydrothermally stable membranes. J Sol-Gel Sci Technol (2008) 48:11-17. (Year: 2008).*
Bronstein, L. Nanoparticles Made in Mesoporous Solids. Top Curr Chem (2003) 226: 55-89. (Year: 2003).*
Khushalani et al. Synthesis of Mesoporous Silica Monoliths with Embedded Nanoparticles. J. Nanosci. Nanotech. 2001, vol. 1, No. 2, 129-132. (Year: 2001).*
Notice of Rejection issued in corresponding Japanese Patent Application No. JP 2014-129305, dated Apr. 28, 2015.
WO-PCT/ISA/210, Salk Institute for Biological Studies.
WO-PCT/ISA/220, Aug. 12, 2008.
International Search Report and Written Opinion for PCT/US09/018933 dated Jul. 8, 2009 11 pages.
Examination Report for European Patent Application No. 09731032.0, dated Jul. 16, 2019.
Kobayashi, Y., et al., "Silica coating of silver nanoparticles using a modified Stober method", Journal of Colloid and Interface Science, 283(2): 392-396, Mar. 1, 2005.
Vadala M. L. et al: "Block copolysiloxilanes and their complexation with cobalt nanoparticles", Polymer, Elsevier Science Publishers B.V, GB, vol. 45, No. 22, Oct. 13, 2004, pp. 7449-7461.
Extended Search Report for the European Application No. 09731032.0, dated Feb. 27, 2020, 8 pages.
Zeng, Z. et al., "Preparation of Functionalized Core-Shell Alumina/Polystyrene Composite Nanoparticles, 1", Macromolecular Chemistry and Physics 206(15):1558-1567 (2005).
Summons to attend oral proceedings pursuant to Rule 115(1) EPC, for Application No. 09731032.0, dated Oct. 23, 2020, 11 pages.

* cited by examiner

COMPOSITE MATERIALS CONTAINING NANOPARTICLES AND THEIR USE IN CHROMATOGRAPHY

CROSS-REFERENCE TO RELATED APPLICATION

This application is a Continuation of U.S. patent application Ser. No. 12/936,782, filed Nov. 18, 2010, now U.S. Pat. No. 9,248,383, which application is the U.S. national phase, pursuant to 35 U.S.C. § 371, of PCT international application Ser. No. PCT/US2009/001893, filed Mar. 27, 2009, designating the United States and published in English on Oct. 15, 2009 as publication WO 2009/126207 A1, which claims priority to U.S. provisional application Ser. No. 61/043,230, filed Apr. 8, 2008. The entire contents of the aforementioned patent applications are incorporated herein by this reference.

BACKGROUND OF THE INVENTION

Packing materials for liquid chromatography (LC) are generally classified into two types: organic materials, e.g., polydivinylbenzene, and inorganic materials typified by silica. Many organic materials are chemically stable against strongly alkaline and strongly acidic mobile phases, allowing flexibility in the choice of mobile phase pH. However, organic chromatographic materials generally result in columns with low efficiency, leading to inadequate separation performance, particularly with low molecular-weight analytes. Furthermore, many organic chromatographic materials not only lack the mechanical strength of typical chromatographic silicas, but also shrink and swell when the composition of the mobile phase is changed.

Due in large part to these limitations, silica is the material most widely used in High Performance Liquid Chromatography (HPLC). The most common applications employ silica that has been surface-derivatized with an organic functional group such as octadecyl ($C_{18}$), octyl ($C_8$), phenyl, amino, cyano, etc. As stationary phases for HPLC, these packing materials result in columns that have high efficiency and do not show evidence of shrinking or swelling.

To overcome the problems of residual silanol group activity (i.e., increased retention, excessive peak tailing and irreversible adsorption of some analytes) and hydrolytic instability of silica-based stationary phases, many methods have been tried including use of ultrapure silica, carbonized silica, coating of the silica surface with polymeric materials, endcapping free silanol groups with a short-chain reagent such as trimethylsilane, and the addition of suppressors such as amines to the eluant. These approaches have not proven to be completely satisfactory in practice.

One approach disclosed in U.S. Pat. No. 4,017,528 relates to a process for preparing a "hybrid" silica, wherein an alkyl functionality is coupled into both the skeleton structure and the surface of the silica. However, numerous problems remained prevalent with these materials, including packing problems associated with inhomogeneous morphology, irregular shapes and high concentrations of micropores that inhibit solute mass transfer, resulting in poor peak shape and band broadening.

Although additional approaches have been used to circumvent these problems, there still remains a need for alternative materials that solve these problems as well as provide additional advantages, for example, mechanical strength, increased column efficiency, and chromatographic selectivity.

SUMMARY OF THE INVENTION

The present invention provides composite materials, their use as chromatographic materials, e.g., particle and monolithic, and devices and systems utilizing these materials. In particular, the composite materials of the invention comprise nanoparticles distributed throughout the skeletal matrix of the polymer network. In certain embodiments, the materials of the invention have increased mechanical strength and improved thermal properties in addition to a pore geometry that is capable of selective chromatographic separation.

Accordingly, one aspect of the invention provides a composite material comprising a nanoparticle dispersed within an inorganic or hybrid material derived from one or more components selected from the group consisting of an organic repeat unit; an organosilyl repeat unit; and an inorganic repeat unit. The material can be represented by the following formula

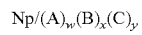
$$Np/(A)_w(B)_x(C)_y$$

wherein:
w, x, and y are each independently a positive number ranging from 0 to 1, such that w+x+y=1;
Np represents the nanoparticle;
A represents the organic repeat unit;
B represents the an organosilyl repeat unit;
C represents the inorganic repeat unit; and
wherein each repeat unit is covalently bonded to one or more separate repeat units A, B, or C.

Another aspect of the invention provides a chromatographic material comprising a composite material, wherein the composite material comprises a nanoparticle dispersed within an inorganic or hybrid material derived from one or more components selected from the group consisting of an organic repeat unit; an organosilyl repeat unit; and an inorganic repeat unit, wherein the composite material is adapted for use in chromatography.

Further aspects of the present invention provide a separations device or a packed chromatography column comprising a chromatographic material of the present invention. In addition, the invention provides a chromatography system comprising this packed chromatography column.

In yet another aspect, the invention provides a porous nanocomposite particle comprising a composite material, wherein the composite material comprises a nanoparticle dispersed within an inorganic or hybrid material derived from one or more components selected from the group consisting of an organic repeat unit; an organosilyl repeat unit; and an inorganic repeat unit. The material may be represented by the following formula

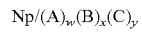
$$Np/(A)_w(B)_x(C)_y$$

wherein:
w, x, and y are each independently a positive number ranging from 0 to 1, such that w+x+y=1;
Np represents the nanoparticle;
A represents the organic repeat unit;
B represents the organosilyl repeat unit;
C represents the inorganic repeat unit; and
wherein each repeat unit is covalently bonded to one or more separate repeat units A, B, or C.

Another aspect of the invention provides a high-pressure tolerant chromatography particle comprising a composite material, wherein the composite material comprises a nanoparticle within an inorganic or hybrid material derived from one or more components selected from the group consisting of an organic repeat unit; an organosilyl repeat unit; and an inorganic repeat unit. The particle of this embodiment is adapted to substantially retain pore structure at fluid pressures greater than 15,000 psi.

An additional aspect of the invention provides a thermally enhanced chromatography particle comprising a composite material, wherein the composite material comprises a nanoparticle within an inorganic or hybrid material derived from one or more components selected from the group consisting of an organic repeat unit; an organosilyl repeat unit; and an inorganic repeat unit. The particle of this embodiment is adapted to improve thermal conduction of the composite material. In yet another aspect, the invention provides a method of preparing a composite material according to the present invention comprising dispersing one or more types of nanoparticles within a polyoligomeric organosiloxane to form a dispersion mixture. The method further comprises condensing the dispersion mixture hydrolytically, such that a material according to the present invention is prepared.

Another aspect of the invention provides a chromatographic material comprising a composite material described herein, wherein the composite material comprises a nanoparticle dispersed within an inorganic or hybrid material derived from one or more components selected from the group consisting of an organic repeat unit; an organosilyl repeat unit; and an inorganic repeat unit, wherein the composite material is adapted for use in chromatography.

In another aspect, the invention provides a composite material described herein, and prepared by any method described herein.

In yet another aspect, the invention provides a method of separating compounds using chromatography. The method comprises the steps of applying a mixture of compounds to a composite material described herein under appropriate chromatographic conditions, such that one or more compounds in the mixture is separated from the mixture of compounds.

An additional aspect of the invention provides a kit comprising a composite material described herein, and instructions for use in separating a mixture of compounds in a chromatographic method.

Another aspect of the invention provides a method of performing a separation comprising running a mixture of compounds through a separations device comprising a composite material described herein, such that at least one compound is separated from the mixture.

DETAILED DESCRIPTION OF THE INVENTION

Figure 1:
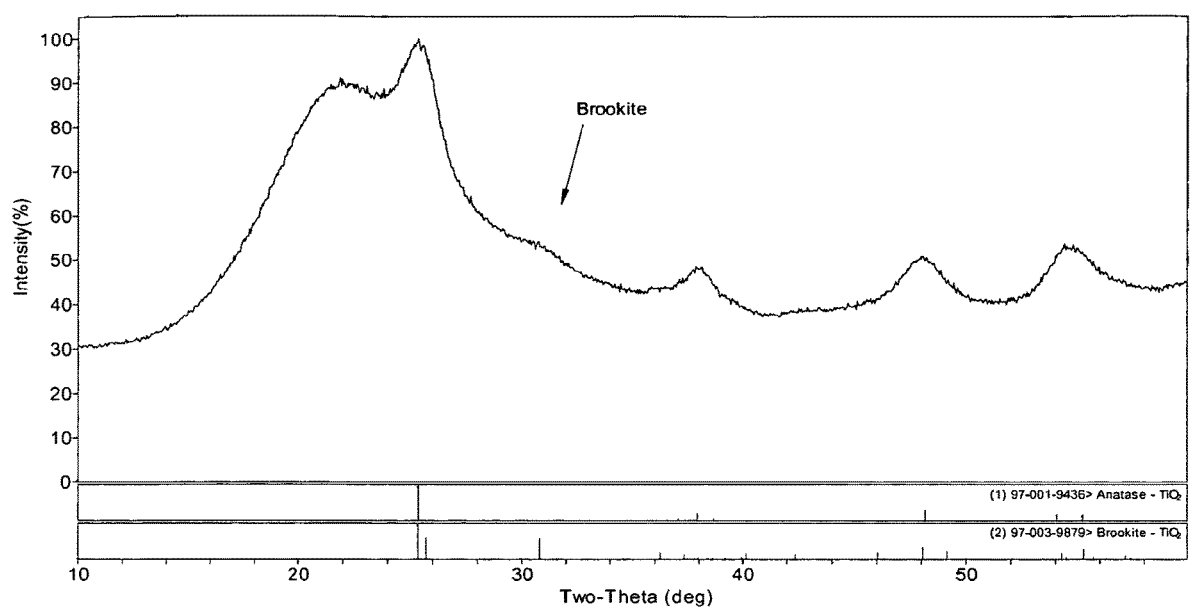
FIG. 1 Sample 6k exhibited X-Ray Diffraction (XRD) evidence of two polymorphs of $TiO_2$, Anatase (77.5% at 4.8 nm) and Brookite (22.5% at 6.6 nm).

The present invention provides unique composite materials that comprise nanoparticles distributed throughout the skeletal matrix of the polymer network. The selection and distribution of these nanoparticles affords the ability to control the physical characteristics of the resulting composite material, such as mechanical strength, thermal properties, and pore structure. Moreover, the present invention provides the use of selected composites as chromatographic material, e.g., particle and monolithic, separation devices that contain this material, as well as systems that employ such separation devices.

However, before further description of the present invention, and in order that the invention may be more readily understood, certain terms have been first defined and collected here for convenience.

I. DEFINITIONS

The language, "adapted to" is used herein to describe the material of the present invention which is capable of or modified to have a certain noted or recited property. For example, "adapted for use as a chromatographic material," is used to describe material of the invention that is modified to be more advantageous for chromatography, and includes, but is not limited to properties such as pore size, surface modification, composition, nanoparticle size, and/or nanoparticle composition.

The language, "composite material" and the term "composite" are used interchangeably herein to describe the engineered materials of the invention composed of one or more components described herein in combination with dispersed nanoparticles, wherein each component/nanoparticle remains separate and distinct on a macroscopic level within the finished structure. The composite material of the present invention is independent of form, and may be monolithic or particulate in nature. Moreover, the short-hand convention used herein to describe a composite material containing a dispersed nanoparticle, $Np/(A)_w(B)_x(C)_y$, may be understood as follows: the symbolic representation to the left of the slash mark represents the dispersed nanoparticle, and the symbolic representations to the right of the slash mark represent the components that comprise the material that the nanoparticle (noted on the left of the slash mark) is dispersed within. In certain embodiments, the composite materials of the present invention may be nanocomposites, which are known to include, at least, for example, nano/nano-type, intra-type, inter-type, and intra/inter-type. (Nanocomposites Science and Technology, edited by P. M. Ajayan, L. S. Schadler, P. V. Braun, Wiley-VCH (Weinheim, Germany), 2003)

The language "chromatographic material" is art-recognized, and describes a material that is particularly suited or adapted for use in the chromatographic separation of chemical mixtures. In certain embodiments, the material of the invention is adapted for use as a chromatographic material.

The language "chromatographic separation" is art-recognized, and describes the process in which a chemical mixture carried by a liquid or gas is separated into its constituent ingredients as a result of differential distribution of the solutes as they flow around or over a stationary liquid or solid phase. For example, chromatographic separations suitable for the materials of the present invention include, but are not limited to liquid chromatographic (including HPLC) methods such as normal-phase HPLC, RP-HPLC, HPLC, and size-exclusion chromatography (SEC), including gel permeation chromatography (GPC). Other suitable separations include additional HPLC methods and related liquid chromatographic techniques, including, e.g., ultra-performance liquid chromatography (UPLC), fast performance liquid chromatography (FPLC) and the like.

The language "chromatographically-enhancing pore geometry" includes the geometry of the pore configuration of certain materials described herein that have been found to enhance the chromatographic separation ability of the material, e.g., as distinguished from other chromatographic media in the art. For example, a geometry can be formed, selected or constructed, and various properties and/or factors can be used to determine whether the chromatographic separations ability of the material has been "enhanced", e.g., as compared to a geometry known or conventionally used in the art. Examples of these factors include high separation efficiency, longer column life, and high mass transfer properties (as evidenced by, e.g., reduced band spreading and good peak shape.) These properties can be measured or observed using art-recognized techniques. For example, the chromatographically-enhancing pore geometry of certain particles of the present invention may be distinguished from the prior art particles by the absence of "ink bottle" or "shell shaped" pore geometry or morphology, both of which are undesirable because they, e.g., reduce mass transfer rates, leading to lower efficiencies.

Chromatographically-enhancing pore geometry is found in composite material containing only a small population of micropores. A small population of micropores is achieved in material when all pores of a diameter of about <34 Å contribute less than about 110 m²/g to the specific surface area of the material. Materials with such a low micropore surface area give chromatographic enhancements including high separation efficiency and good mass transfer properties (as evidenced by, e.g., reduced band spreading and good peak shape). Micropore surface area is defined as the surface area in pores with diameters less than or equal to 34 Å, determined by multipoint nitrogen sorption analysis from the adsorption leg of the isotherm using the BJH method.

The terms "coalescing" and "coalesced" are intended to describe a material in which several individual components have become coherent to result in one new component by an appropriate chemical or physical process, e.g., heating. The term coalesced is meant to be distinguished from a collection of individual particles in close physical proximity, e.g., in a bed formation, in which the end product comprises individual particles.

The terms "dispersed" and "dispersion" are used herein to describe the distribution of the nanoparticles within the composite materials of the invention. The term "dispersed" includes the reasonably uniform or homogeneous distribution, as well as heterogeneous distribution, each of which may arise from the methods of preparation of the composite material as described herein (i.e., and in certain embodiments, may be explained as a statistical distribution). In a particular embodiment, the dispersion is a reasonably homogeneous distribution.

The term "functionalized" is used herein to describe those materials of the present invention containing a functionalizing group.

The term "functionalizing group" includes organic functional groups which impart a certain chromatographic functionality to a chromatographic stationary phase, including, e.g., octadecyl ($C_{18}$) or phenyl. Such functionalizing groups are present in, for example, surface modifiers such as disclosed herein which are attached to the base material, e.g., via derivatization or coating and later crosslinking, imparting the chemical character of the surface modifier to the base material. In an embodiment, such surface modifiers have the formula $Z_a(R')_b Si-R$, where Z=Cl, Br, I, $C_1$-$C_5$ alkoxy, dialkylamino, e.g., dimethylamino, or trifluoromethanesulfonate; a and b are each an integer from 0 to 3 provided that a+b=3; R' is a $C_1$-$C_6$ straight, cyclic or branched alkyl group, and R is a functionalizing group. R' may be, e.g., methyl, ethyl, propyl, isopropyl, butyl, t-butyl, sec-butyl, pentyl, isopentyl, hexyl or cyclohexyl. In particular embodiments, R' is methyl.

The term "hybrid", i.e., as used in "hybrid material" is used herein as shorthand for the language "inorganic/organic hybrid material," and describes material that possesses inorganic-based structures wherein an organic functionality is integral to both the internal or "skeletal" inorganic structure as well as the hybrid material surface. The inorganic portion of the hybrid material may be, e.g., alumina, silica, titanium or zirconium oxides, or ceramic material; in a preferred embodiment, the inorganic portion of the hybrid material is silica. Exemplary hybrid materials are shown in U.S. Pat. No. 4,017,528, the text of which is incorporated herein by reference.

The language "inorganic repeat unit" describes a chemically distinct inorganic constituent or component of the composite materials of the present invention. In certain embodiments, the inorganic repeat unit is represented by the symbol "C," which may comprise one or more different forms of inorganic repeat unit and which may, for example, be selected from the group consisting of alumina, silica, titanium, cerium, or zirconium oxides, and ceramic materials. In particular embodiments, the inorganic repeat unit may be

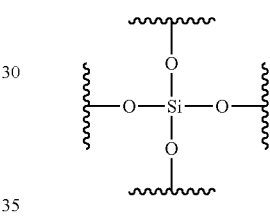

Moreover, it should be understood that the inorganic repeat unit is described herein based on its form as incorporated into the matrix of the composite material, and therefore includes, for example, tetramethoxysilane, tetraethoxysilane, tetrapropoxysilane, and tetrabutoxysilane, e.g., tetramethoxysilane or tetraethoxysilane (which are known surrogates for silica). For example, in one embodiment, the inorganic precursors are selected from the group consisting of the oxide, hydroxide, ethoxide, methoxide, propoxide, isopropoxide, butoxide, sec-butoxide, tert-butoxide, iso-butoxide, phenoxide, ethylhexyloxide, 2-methyl-2-butoxide, nonyloxide, isooctyloxide, glycolates, carboxylate, acetate, oxylate, nitrate, chlorides, amines, and mixtures thereof of silicon, titanium, zirconium, cerium or aluminum. In a particular embodiment, the inorganic precursors may be selected from the group consisting of one or more of methyl titanium triisopropoxide, methyl titanium triphenoxide, titanium allylacetoacetatetriisopropoxide, titanium methacrylate triisopropoxide, titanium methacryloxyethylacetoacetate triisopropoxide, pentamethylcyclopentadienyl titanium trimethoxide, pentamethylcyclopentadienyl titanium trichloride, zirconium methacryloxyethylacetoacetate tri-n-propoxide, cerium chloride, cerium acetate, and cerium oxalate.

The term "monolith" is art-recognized and describes a porous, three-dimensional material having a continuous interconnected pore structure in a single piece. The term monolith is meant to be distinguished from a collection of individual particles packed into a bed formation, in which the end product comprises individual particles. In one embodiment, a monolith of the invention is prepared by casting precursors into a mold of a desired shape. In another embodiment, the monolith comprises coalesced particles. In yet another embodiment, the monolith material may be used for chromatography, i.e., the monolith is a chromatographically useful material, e.g., a chromatographic column The term "nanoparticle" is a microscopic particle/grain or microscopic member of a powder/nanopowder with at least one dimension less than about 100 nm, e.g., a diameter or particle thickness of less than about 100 nm (0.1 µm), which may be crystalline or noncrystalline. Nanoparticles have properties different from, and often superior to those of conventional bulk materials including, for example, greater strength, hardness, ductility, sinterability, and greater reactivity among others. Considerable scientific study continues to be devoted to determining the properties of nanomaterials, small amounts of which have been synthesized (mainly as nano-size powders) by a number of processes including colloidal precipitation, mechanical grinding, and gas-phase nucleation and growth. Extensive reviews have documented recent developments in nano-phase materials, and are incorporated herein by reference thereto: Gleiter, H. (1989) "Nano-crystalline materials," Prog. Mater. Sci. 33:223-315 and Siegel, R. W. (1993) "Synthesis and properties of nano-phase materials," Mater. Sci. Eng. A168:189-197. In certain embodiments, the nanoparticles comprise oxides or nitrides of the following: silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, and mixtures thereof. In certain embodiments, the nanoparticles of the present invention are selected from diamonds, zirconium oxide (amorphous, monoclinic, tetragonal and cubic forms), titanium oxide (amorphous, anatase, brookite and rutile forms), aluminum (amorphous, alpha, and gamma forms), and boronitride (cubic form). In particular embodiments, the nanoparticles of the present invention are selected from nano-diamonds, silicon carbide, titanium dioxide (anatase form), cubic-boronitride, and any combination thereof. Moreover, in particular embodiments, the nanoparticles may be crystalline or amorphous. In particular embodiments, the nanoparticles are less than or equal to 100 nm in diameter, e.g., less than or equal to 50 nm in diameter, e.g., less than or equal to 20 nm in diameter.

Moreover, it should be understood that the nanoparticles that are characterized as dispersed within the composites of the invention are intended to describe exogenously added nanoparticles. This is in contrast to nanoparticles, or formations containing significant similarity with putative nanoparticles, that are capable of formation in situ, wherein, for example, macromolecular structures, such as particles, may comprise an aggregation of these endogenously created.

Nanoparticles are of great scientific interest as they are effectively a bridge between bulk materials and atomic or molecular structures. A bulk material should have constant physical properties regardless of its size, but at the nanoscale this is often not the case. Size-dependent properties are observed such as quantum confinement in semiconductor particles, surface plasmon resonance in some metal particles and superparamagnetism in magnetic materials.

The properties of materials change as their size approaches the nanoscale and as the percentage of atoms at the surface of a material becomes significant. For bulk materials larger than one micrometer the percentage of atoms at the surface is minuscule relative to the total number of atoms of the material. The interesting and sometimes unexpected properties of nanoparticles are partly due to the aspects of the surface of the material dominating the properties in lieu of the bulk properties. In certain embodiments, selection of the nanoparticle affects the selectivity of the chromatographic material. For example, dispersion of $TiO_2$ or zirconium oxide could modify the surface charge, surface acidity, and therefore, the chromatographic selectivity.

The term "obtaining" as in obtaining a material, component or substance is intended to include buying, synthesizing or otherwise acquiring the material. In certain embodiments of the invention, the methods comprise an additional step of obtaining the sample or reagents for use in the methods of the invention.

The language "organic repeat unit" describes a chemically distinct hydrocarbon-based constituent or component of the composite materials of the present invention. The organic repeat unit may contain polymerizable or non-polymerizable moieties, and may be functionalized with a variety of functional groups, e.g., polar or non-polar groups. In certain embodiments, the organic repeat unit is represented by the symbol "A," which may comprise one or more different forms of organic repeat unit and which may, for example, be a substituted ethylene group. In a particular embodiment, "A" may be selected from the group consisting of

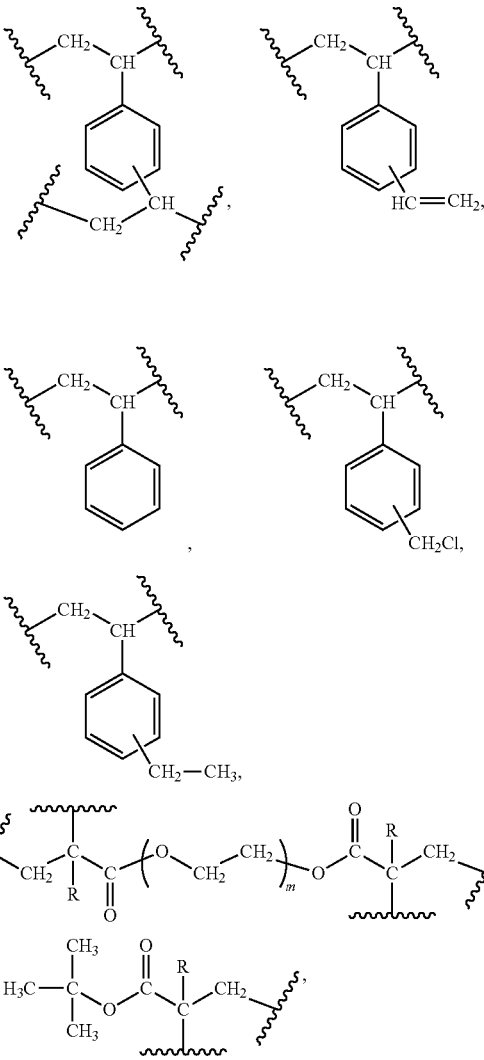

-continued

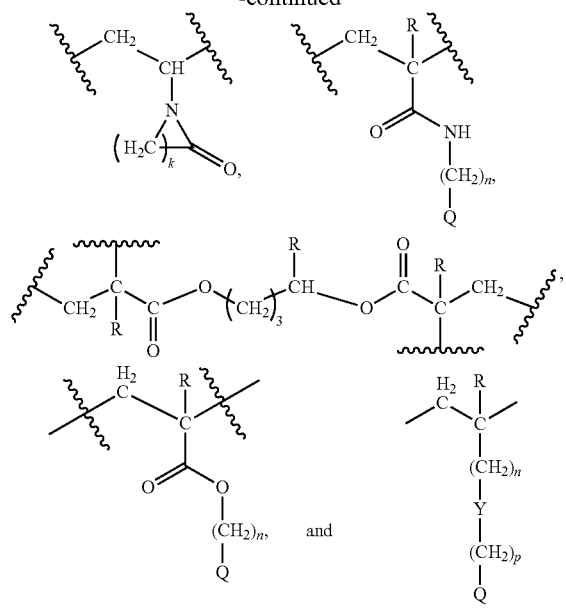

wherein
k is an integer from 3-6;
m is an integer of from 1 to 20;
n and p are each independently integers of from 0 to 10;
Y is O, $S(O)_{0-2}$, NH, NR, $NR_2$ (when p is 0), $NR_2^+X^-$ (when p is not 0), or $NR_3^+X^-$ when p is 0, and where $X^-$ is any anion (e.g., $Cl^-$, $OH^-$, carbonate),
Q is hydrogen, $N(C_{1-6}alkyl)_3$, $N(C_{1-6}alkyl)_2(C_{1-6}alkyl-SO_3)$, or $C(C_{1-6}$ hydroxy $alkyl)_3$, $—CH(OH)CH_2(OH)$, $OCH_2CH(OH)CH_2(OH)$,

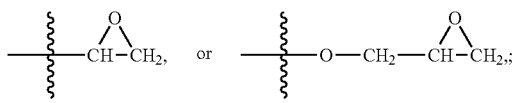

and
each R, $R_2$, and $R_3$ is independently H or a $C_1$-$C_{10}$ alkyl group. In particular embodiments, each R may be independently hydrogen, methyl, ethyl, or propyl.

Moreover, in certain embodiments, repeat unit A may be derived from a variety of organic repeat unit reagents possessing one or more polymerizable moieties, capable of undergoing polymerization, e.g., a free radical-mediated polymerization. Specifically, A repeat units may be oligomerized or polymerized by a number of processes and mechanisms including, but not limited to, chain addition and step condensation processes, radical, anionic, cationic, ring-opening, group transfer, metathesis, and photochemical mechanisms.

The language "organosilyl repeat unit" describes a chemically distinct silane-based constituent or component of the composite materials of the present invention that is functionalized with at least one organic moiety directly bonded to the silicon atom, e.g., an organosiloxane (e.g., $R'_q$—Si$(OR'')_{4-q}$, wherein R' and R'' are lower alkyl moieties and q is a positive number ranging from 0 to 4). The organic moiety may contain polymerizable or non-polymerizable functional groups. In certain embodiments, the organic repeat unit is represented by the symbol "B," which may comprise one or more different forms of organosilyl repeat unit and which may, for example, be an oxysilyl-substituted alkyl group.

In one embodiment, the organosilyl repeat unit has formula I:

wherein,
$R^4$ and $R^5$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;
$R^6$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;
p and q are each independently 0.0 to 3.0,
t is 0.5, 1.0, or 1.5;
m is an integer from 1-20; wherein $R^4$, $R^5$ and $R^6$ are optionally substituted; provided that: (1) when $R^6$ is absent, m=1 and $$t = \frac{(4-(p+q))}{2},$$

when p+q≤3; and
(2) when $R^6$ is present, m=2-20 and $$t = \frac{(3-(p+q))}{2},$$

when p+q≤2.

In certain embodiments, $R^6$ is absent, t=1.5 when p+q=1; or t=1 when p+q=2. In other embodiments, $R^2$ is present, p=0, q is 0 or 1 and t=1.5 when q=0; or t=1 when q=1.

In certain embodiments, $R^6$ is absent. In other embodiments, $R^6$ is present. In one embodiment of formula I in which $R^6$ is present, the invention provides a organosilyl repeat unit of formula I, wherein p is 0, q is 0, t is 1.5, m is 2, and $R^6$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl; wherein each $R^6$ is attached to two or more silicon atoms.

In other embodiments of formula I in which $R^6$ is present, the invention the invention provides a organosilyl repeat unit of formula I, wherein q is 0, and $R^6$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl; and wherein each $R^6$ is attached to two or more silicon atoms. In a further embodiment, p is 0, 1, or 2. In another further embodiment, t is 1.0 or 1.5. In another embodiment, m is 1 or 2.

In another embodiment, the organosilyl repeat unit of the invention has formula II:

wherein,
$R^4$ and $R^5$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;
p and q are each independently 0.0 to 3.0, provided that when p+q=1 then t=1.5; when p+q=2 then t=1; or when p+q=3 then t=0.5.

In yet another embodiment, the organosilyl repeat unit of the invention has formula III:

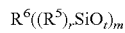
(III)

wherein, $R^5$ is $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^6$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

r is 0, 1 or 2, provided that when r=0 then t=1.5; when r=1 then t=1; or when r=2, then t=0.5; and m is an integer from 1-20.

In various embodiments, the invention the invention provides a organosilyl repeat unit of formulas I and II, wherein R is $C_1$-$C_{18}$ alkoxy, $C_1$-$C_{18}$ alkyl, or $C_1$-$C_{18}$ alkyl. In various embodiments, the invention the invention provides a organosilyl repeat unit of formulas I, II and III, wherein $R^1$ is $C_1$-$C_{18}$ alkoxy, $C_1$-$C_{18}$ alkyl, or $C_1$-$C_{18}$ alkyl. In various embodiments, the invention the invention provides a organosilyl repeat unit of formulas I and III, wherein $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl.

In a particular embodiment, the organosilyl repeat unit may be selected from the group consisting of

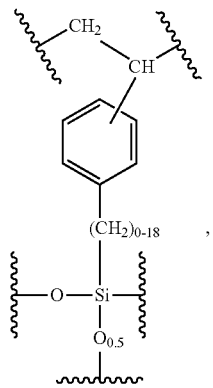
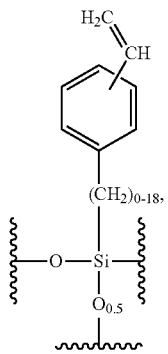
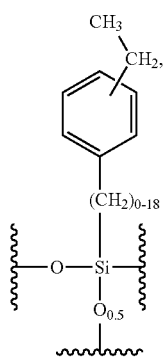
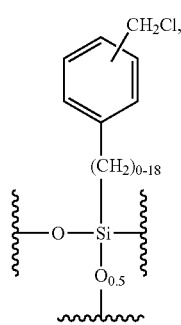

-continued

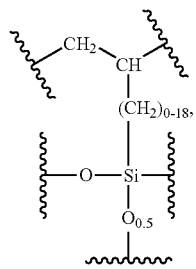
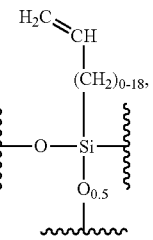
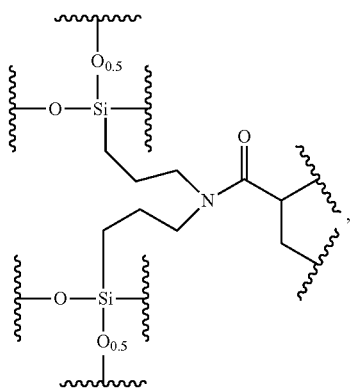

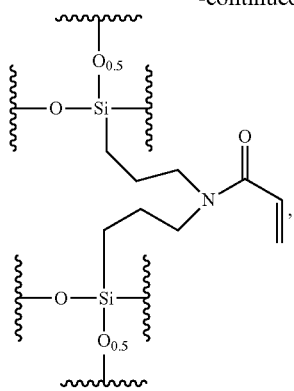
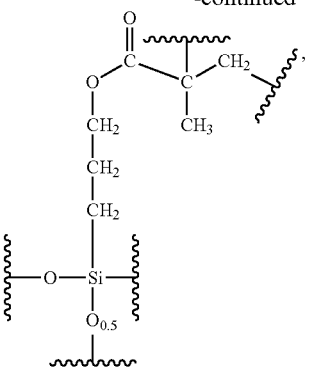
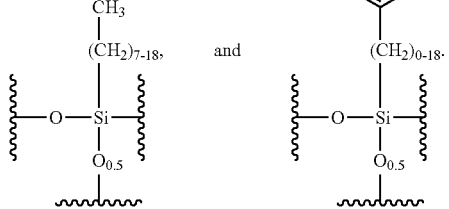
In a specific embodiment, the organosilyl repeat unit may be selected from the group consisting of
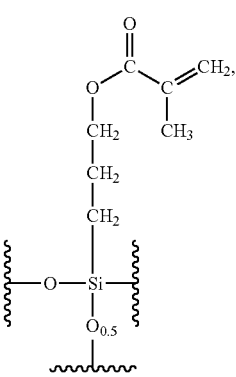
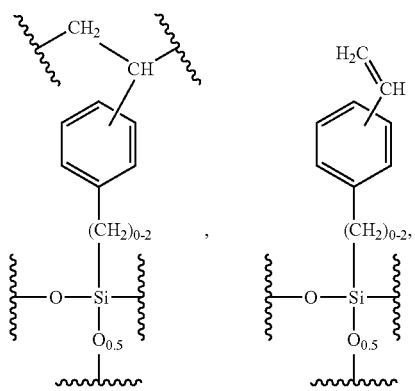
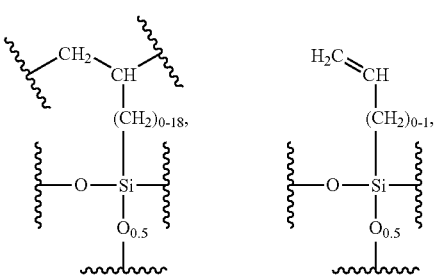
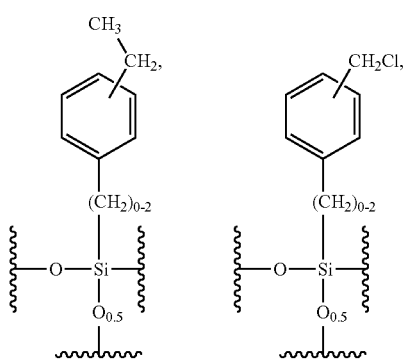
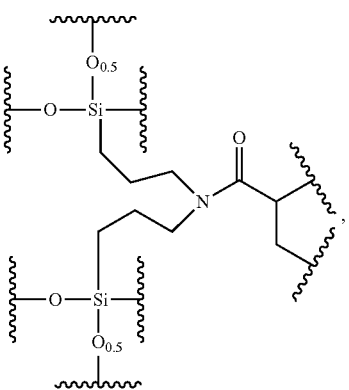

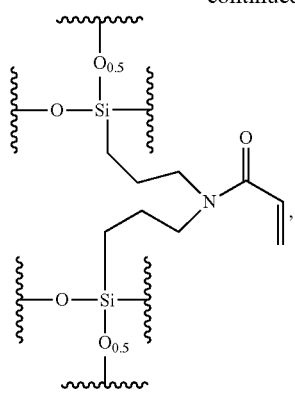
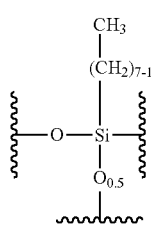 and 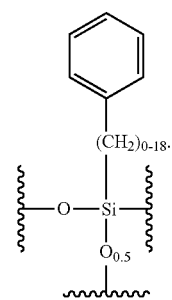
For example, in one particular embodiment, the organosilyl repeat unit may be selected from the group consisting of
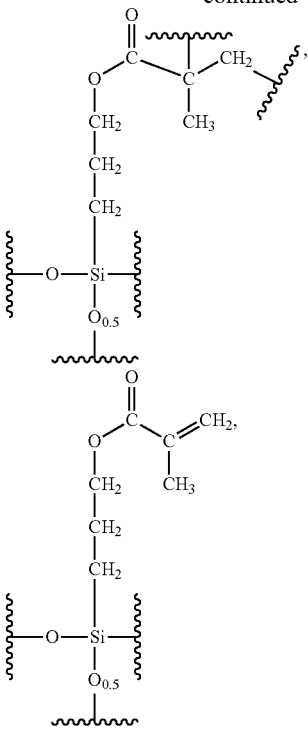
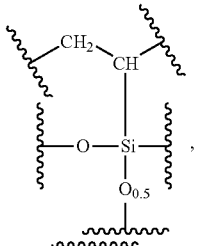, 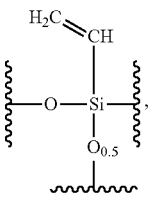
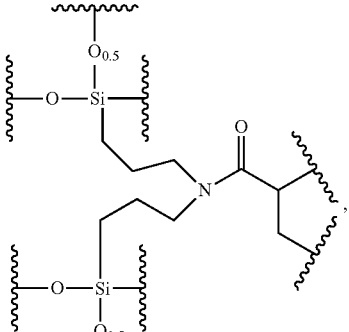

-continued

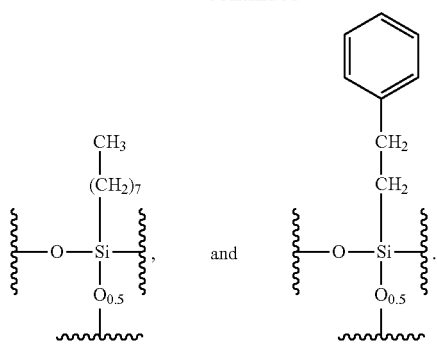

For example, in one particular embodiment, the organosilyl repeat unit may be selected from the group consisting of

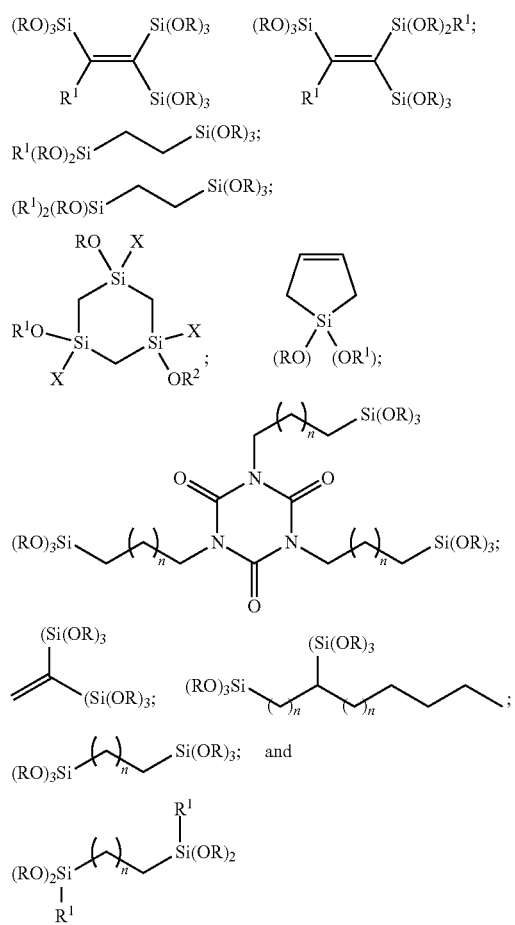

wherein R, $R^1$ and $R^2$ are as defined previously; X is $C_1$-$C_{18}$ alkoxy or $C_1$-$C_{18}$ alkyl; and n is 1-8.

In certain embodiments, the monomer is 1,2-bis(triethoxysilyl)ethane:

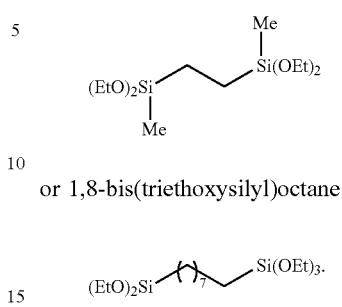

In other embodiments, the monomer is 1,2-bis(methyldiethoxy silyl)ethane:

(EtO)$_2$Si—CH$_2$CH$_2$—Si(OEt)$_2$ with Me groups or 1,8-bis(triethoxysilyl)octane:

(EtO)$_3$Si—(CH$_2$)$_7$—Si(OEt)$_3$.

The language "repeat unit" as used herein, describes a monomer unit that forms a constituent group of the composites described herein, in contrast to and distinct from a reactant that is used to prepare the composites of the present invention. For example, any reactant may be used that could arrive at the repeat units classified herein that ultimately form part of the constituent matrix of the composite. Moreover, the repeat units described herein (organic (A), organosilyl (B), and inorganic (C)) may be ordered as random, block, or a combination of random and block. A is an organic repeat unit which is covalently bonded to one or more repeat units A or B via an organic bond. B is an organosilyl repeat unit which is bonded to one or more repeat units B or C via an inorganic siloxane bond and which may be further bonded to one or more repeat units A or B via an organic bond. C is an inorganic repeat unit which is bonded to one or more repeat units B or C via an inorganic bond.

The language "surface modified" is used herein to describe the composite material of the present invention that possess both organic groups and silanol groups which may additionally be substituted or derivatized with a surface modifier. "Surface modifiers" include (typically) organic functional groups which impart a certain chromatographic functionality to a chromatographic stationary phase. Surface modifiers such as disclosed herein are attached to the base material, e.g., via derivatization or coating and later crosslinking, imparting the chemical character of the surface modifier to the base material. In one embodiment, the organic groups of a hybrid material, e.g., particle, react to form an organic covalent bond with a surface modifier. The modifiers can form an organic covalent bond to the material's organic group via a number of mechanisms well known in organic and polymer chemistry including but not limited to nucleophilic, electrophilic, cycloaddition, free-radical, carbene, nitrene, and carbocation reactions. Organic covalent bonds are defined to involve the formation of a covalent bond between the common elements of organic chemistry including but not limited to hydrogen, boron, carbon, nitrogen, oxygen, silicon, phosphorus, sulfur, and the halogens. In addition, carbon-silicon and carbon-oxygen-silicon bonds are defined as organic covalent bonds, whereas silicon-oxygen-silicon bonds that are not defined as organic covalent bonds. A variety of synthetic transformations are well known in the literature, see, e.g., March, J. *Advanced Organic Chemistry*, 3$^{rd}$ Edition, Wiley, New York, 1985.

The language "substantially retaining column efficiency" is used herein to describe the ability of a chromatographic material of a column to retain greater than 90% of its efficiency under a specified set of conditions as compared with the efficiency prior to subjection to such conditions.

The language "substantially retaining pore structure" is used herein to describe the ability of the pore structure to retain its integrity under a specified set of conditions such that the material remains chromatographically useful.

II. MATERIALS OF THE INVENTION

A. Composites

Accordingly, one embodiment of the invention provides a composite material comprising a nanoparticle dispersed within an inorganic or hybrid material derived from one or more components selected from an organic repeat unit; an organosilyl repeat unit; and an inorganic repeat unit. In certain embodiments, the material is represented by the following formula $$Np/(A)_w(B)_x(C)_y$$

wherein:
w, x, and y are each independently a positive number ranging from 0 to 1, such that w+x+y=1;
Np represents the nanoparticle;
A represents the organic repeat unit;
B represents the organosilyl repeat unit;
C represents the inorganic repeat unit; and
wherein each repeat unit is covalently bonded to one or more separate repeat units A, B, or C. In one particular embodiment, the w is 0, e.g., wherein x is 1 or x is 0.20 and y is 0.8. In another particular embodiment, x ranges from 0.04 to 1, e.g., 0.04 to 0.50.

As such, in certain embodiments of the invention, the material may be represented by the following formula $$Np/(B)_x(C)_y$$

wherein:
x and y are each independently a positive number ranging from 0 to 1, such that w+x+y=1;
Np represents the nanoparticle;
B represents the organosilyl repeat unit;
C represents the inorganic repeat unit; and
wherein each repeat unit is covalently bonded to one or more separate repeat units A, B, or C. In one particular embodiment, x is 1 or x is 0.20 and y is 0.8. In another particular embodiment, x ranges from, 0 to 1, e.g., 0.04 to 1, e.g., 0.04 to 0.50. Accordingly, in more specific embodiments, the material may be represented by either Np/B (e.g., represented by one or more of formula I, II, or III, wherein $R^6$ is ethylene) or Np/C (e.g., wherein C is silica).

Exemplary embodiments of the composite material include, but are not limited to
(B)y(C)z where B=$O_{1.5}SiCH_2CH_2SiO_{1.5}$ and C=$SiO_2$, and y=0.2, z=0.8 or when y is 0.2-1.0 and z is 0.8-0;
(B)y(C)z where B=$O_{1.5}SiCH_2CH_2SiO_{1.5}$ and C=$SiO_2$, and y=0.2, z=0.8 or when y is 0.2 and z is 0.8;
(B)y(C)z where B=$O_{1.5}SiCH_2CH_2SiO_{1.5}$ and y=1 and z=0; and
(B)y(C)z where C=$SiO_2$ and z=1 and y=0.

For example, the present invention provides a chromatographic material comprising a composite material, e.g., a composite material described herein, wherein the composite material comprises a nanoparticle dispersed within an inorganic or hybrid material derived from one or more components selected from the group consisting of an organic repeat unit; an organosilyl repeat unit; and an inorganic repeat unit, wherein the composite material is adapted for use in chromatography. However, in certain embodiments, the chromatographic material is represented by the following formula $$Np/(A)_w(B)_x(C)_y$$

wherein:
w, x, and y are each independently a positive number ranging from 0 to 1, such that w+x+y=1;
Np represents the nanoparticle;
A represents the organic repeat unit;
B represents the organosilyl repeat unit;
C represents the inorganic repeat unit; and
wherein each repeat unit is covalently bonded to one or more separate repeat units A, B, or C.

The nanoparticles of the invention may comprise, for example, oxides or nitrides of the following: silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, and mixtures thereof. Moreover, in particular embodiments, the nanoparticles may be crystalline or amorphous. In particular embodiments, the nanoparticles are less than or equal to 200 nm in diameter, e.g., less than or equal to 100 nm in diameter, e.g., less than or equal to 50 nm in diameter, e.g., less than or equal to 20 nm in diameter.

Interest in nanoparticles has grown over the last two decades because of the unusual properties that these particles possess, properties that generally arise from the large surface area to volume ratios of the particles, but also from their size. Once formed, the nanoparticles are dispersed within the composites of the invention to arrive at novel composite materials, e.g., of the formula described above. In particular embodiments, the nanoparticle is present in <20% by weight of the nanocomposite, e.g., the nanoparticle is present in <5% by weight of the nanocomposite.

The potential applications of composites made herein comprising nanoparticles, include but are not limited to wear resistant coatings, thermal barrier coatings, ductile ceramics, new electronic and optical devices, and catalysts. Thus, composites comprising well known nanoparticles, as well as nanoparticles that have been selected and/or prepared to achieve or produce a particular property in the resulting composite, are intended to be within the scope of the present invention. For example, nanoparticles that may be used herein include well-known nanoparticles that have been made from metals (for example, Pd, Cu, Fe, Ag, Ni), intermetallics (for example, $Al_{52}Ti_{48}$), and metal oxides (for example, $TiO_2$, $Y_2O_3$, ZnO, MgO, $Al_2O_3$). In certain embodiments, the nanoparticle is crystalline or amorphous.

The inorganic or hybrid material in which the nanoparticles are dispersed may be derived from one or more components selected from the group consisting of an organic repeat unit; an organosilyl repeat unit; and an inorganic repeat unit, wherein q is a positive number ranging from 0 to 4. In certain embodiments, at least one of repeat units A, B, or C is a mixture comprising two or more repeat units, e.g., the organic repeat unit A may be comprised of two or more separate repeat units A' and A" that may be collectively referred to as the A repeat unit. Moreover, the order of repeat units and nanoparticles may be random, block, or a combination thereof.

The resulting material may be a particle or a monolith. As such, in a specific embodiment, the material is a particle, which may be substantially spherical or non-spherical (e.g., ill-defined, granular, or agglomerated particles); wherein the particles may be crystalline or amorphous, with an average diameter of about 0.1 to 300 µm, e.g., about 0.1 to 30 µm., e.g., about 0.1 to 20 µm. The pore structure of the material may be ordered, e.g., periodic, or disordered, e.g., non-crystalline or amorphous, with an average pore diameter of about 20 to 5000 Å, e.g., about 20 to 2000 Å, e.g., about 30 to 1000 Å, e.g., about 60 to 400 Å, e.g., about 80 to 200 Å, e.g., about 90 to 150 Å. The specific surface area of the material is about 20 to 1100 m$^2$/g, e.g., about 80-500 m$^2$/g or about 800-1100 m$^2$/g, and has specific pore volumes of about 0.2 to 1.7 cm$^3$/g, e.g., about 0.6 to 1.3 cm$^3$/g. In certain embodiments, the material has a chromatographically enhancing pore geometry.

Moreover, in one embodiment, the invention provides porous, spherical particles that have pore structures which are either ordered or disordered (e.g., non-crystalline or amorphous) molecular ordering, as well as periodic pore structure. The controlled range of average pore diameters of the particles of the invention provide a distribution of chromatographically useful pore structure within a particle, allowing for the use of the material for a wide range of chromatographic applications, including separations of small molecules, peptides, proteins, nucleotides, polymeric molecules, and other macromolecules.

The present invention further provides that the material, e.g., particles, may be surface modified by a surface modifier selected from the group consisting of an organic group surface modifier, a silanol group surface modifier, a polymeric coating surface modifier, and any combination thereof. For example, the invention provides materials, such as particles, wherein the particles have been surface modified by a combination of organic group and silanol group modification, wherein the particles have been surface modified by silanol group modification, or wherein the particles have been surface modified by coating with a polymer, e.g., Sylgard®. In certain embodiments, the surface modifier has the formula $Z_a(R^1)_b Si—R^2$, where Z=Cl, Br, I, $C_1$-$C_5$ alkoxy, dialkylamino or trifluoromethanesulfonate; a and b are each an integer from 0 to 3 provided that a+b=3; $R^1$ is a $C_1$-$C_6$ straight, cyclic or branched alkyl group, and $R^2$ is a functionalizing group. In particular embodiments $R^1$ is selected from the group consisting of methyl, ethyl, propyl, isopropyl, butyl, t-butyl, sec-butyl, pentyl, isopentyl, hexyl and cyclohexyl, e.g., methyl.

The functionalizing group $R^2$ may include of alkyl, alkenyl, alkynyl, aryl, cyano, amino, diol, nitro, cation or anion exchange groups, or embedded polar functionalities. Examples of suitable R functionalizing groups include $C_1$-$C_{30}$ alkyl, including $C_1$-$C_{20}$, such as octyl ($C_8$), octadecyl ($C_{18}$), and triacontyl ($C_{30}$); alkaryl, e.g., $C_1$-$C_4$-phenyl; cyanoalkyl groups, e.g., cyanopropyl; diol groups, e.g., propyldiol; amino groups, e.g., aminopropyl; and alkyl or aryl groups with embedded polar functionalities, e.g., carbamate functionalities such as disclosed in U.S. Pat. No. 5,374,755, the text of which is incorporated herein by reference. Such groups include those of the general formula

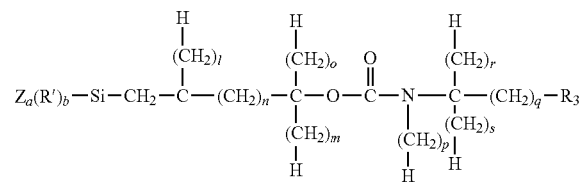

wherein l, m, o, r, and s are 0 or 1, n is 0, 1, 2 or 3 p is 0, 1, 2, 3 or 4 and q is an integer from 0 to 19; $R_3$ is selected from the group consisting of hydrogen, alkyl, cyano and phenyl; and Z, R', a and b are defined as above. In particular embodiments, the carbamate functionality has the general structure indicated below:

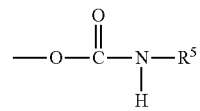

wherein $R^5$ may be, e.g., cyanoalkyl, t-butyl, butyl, octyl, dodecyl, tetradecyl, octadecyl, or benzyl. In specific embodiments, $R^5$ is octyl, dodecyl, or octadecyl. In a particular embodiment, the surface modifier may be an organotrihalosilane, such as octyltrichlorosilane or octadecyltrichlorosilane, or a halopolyorganosilane, such as octyldimethylchlorosilane or octadecyldimethylchlorosilane.

In another embodiment, the organic groups and silanol groups of the material are both surface modified or derivatized. In another embodiment, the particles are surface modified by coating with a polymer. In certain embodiments, surface modification by coating with a polymer is used in conjunction with silanol group modification, organic group modification, or both silanol and organic group modification.

Polymer coatings are also known in the literature and may be provided generally by polymerization or polycondensation of physisorbed repeat units onto the surface of the materials of the present invention without chemical bonding of the polymer layer to the support (type I), polymerization or polycondensation of physisorbed repeat units onto the surface with chemical bonding of the polymer layer to the support (type II), immobilization of physisorbed prepolymers to the support (type III), and chemisorption of presynthesized polymers onto the surface of the support (type IV). see, e.g., Hanson et al., *J. Chromat. A* 656 (1993) 369-380, the text of which is incorporated herein by reference. As noted above, coating the material of the invention with a polymer may be used in conjunction with various surface modifications described in the invention.

The term "aliphatic group" includes organic compounds characterized by straight or branched chains, typically having between 1 and 22 carbon atoms. Aliphatic groups include alkyl groups, alkenyl groups and alkynyl groups. In complex structures, the chains can be branched or cross-linked. Alkyl groups include saturated hydrocarbons having one or more carbon atoms, including straight-chain alkyl groups and branched-chain alkyl groups. Such hydrocarbon moieties may be substituted on one or more carbons with, for example, a halogen, a hydroxyl, a thiol, an amino, an alkoxy, an alkylcarboxy, an alkylthio, or a nitro group. Unless the number of carbons is otherwise specified, "lower aliphatic" as used herein means an aliphatic group, as defined above (e.g., lower alkyl, lower alkenyl, lower alkynyl), but having from one to six carbon atoms. Representative of such lower aliphatic groups, e.g., lower alkyl groups, are methyl, ethyl, n-propyl, isopropyl, 2-chloropropyl, n-butyl, sec-butyl, 2-aminobutyl, isobutyl, tert-butyl, 3-thiopentyl, and the like. As used herein, the term "nitro" means —NO$_2$; the term "halogen" designates —F, —Cl, —Br or —I; the term "thiol" means SH; and the term "hydroxyl" means —OH. Thus, the term "alkylamino" as used herein means an alkyl group, as defined above, having an amino group attached thereto. Suitable alkylamino groups include groups having 1 to about 12 carbon atoms, preferably from 1 to about 6 carbon atoms. The term "alkylthio" refers to an alkyl group, as defined above, having a sulfhydryl group attached thereto. Suitable alkylthio groups include groups having 1 to about 12 carbon atoms, preferably from 1 to about 6 carbon atoms. The term "alkylcarboxyl" as used herein means an alkyl group, as defined above, having a carboxyl group attached thereto. The term "alkoxy" as used herein means an alkyl group, as defined above, having an oxygen atom attached thereto. Representative alkoxy groups include groups having 1 to about 12 carbon atoms, preferably 1 to about 6 carbon atoms, e.g., methoxy, ethoxy, propoxy, tert-butoxy and the like. The terms "alkenyl" and "alkynyl" refer to unsaturated aliphatic groups analogous to alkyls, but which contain at least one double or triple bond respectively. Suitable alkenyl and alkynyl groups include groups having 2 to about 12 carbon atoms, preferably from 1 to about 6 carbon atoms.

The term "alicyclic group" includes closed ring structures of three or more carbon atoms. Alicyclic groups include cycloparaffins or naphthenes which are saturated cyclic hydrocarbons, cycloolefins which are unsaturated with two or more double bonds, and cycloacetylenes which have a triple bond. They do not include aromatic groups. Examples of cycloparaffins include cyclopropane, cyclohexane, and cyclopentane. Examples of cycloolefins include cyclopentadiene and cyclooctatetraene. Alicyclic groups also include fused ring structures and substituted alicyclic groups such as alkyl substituted alicyclic groups. In the instance of the alicyclics such substituents can further comprise a lower alkyl, a lower alkenyl, a lower alkoxy, a lower alkylthio, a lower alkylamino, a lower alkylcarboxyl, a nitro, a hydroxyl, —CF$_3$, —CN, or the like.

The term "heterocyclic group" includes closed ring structures in which one or more of the atoms in the ring is an element other than carbon, for example, nitrogen, sulfur, or oxygen. Heterocyclic groups can be saturated or unsaturated and heterocyclic groups such as pyrrole and furan can have aromatic character. They include fused ring structures such as quinoline and isoquinoline. Other examples of heterocyclic groups include pyridine and purine. Heterocyclic groups can also be substituted at one or more constituent atoms with, for example, a halogen, a lower alkyl, a lower alkenyl, a lower alkoxy, a lower alkylthio, a lower alkylamino, a lower alkylcarboxyl, a nitro, a hydroxyl, —CF$_3$, —CN, or the like. Suitable heteroaromatic and heteroalicyclic groups generally will have 1 to 3 separate or fused rings with 3 to about 8 members per ring and one or more N, O or S atoms, e.g. coumarinyl, quinolinyl, pyridyl, pyrazinyl, pyrimidyl, furyl, pyrrolyl, thienyl, thiazolyl, oxazolyl, imidazolyl, indolyl, benzofuranyl, benzothiazolyl, tetrahydrofuranyl, tetrahydropyranyl, piperidinyl, morpholino and pyrrolidinyl.

The term "aromatic group" includes unsaturated cyclic hydrocarbons containing one or more rings. Aromatic groups include 5- and 6-membered single-ring groups which may include from zero to four heteroatoms, for example, benzene, pyrrole, furan, thiophene, imidazole, oxazole, thiazole, triazole, pyrazole, pyridine, pyrazine, pyridazine and pyrimidine, and the like. The aromatic ring may be substituted at one or more ring positions with, for example, a halogen, a lower alkyl, a lower alkenyl, a lower alkoxy, a lower alkylthio, a lower alkylamino, a lower alkylcarboxyl, a nitro, a hydroxyl, —CF$_3$, —CN, or the like.

The term "alkyl" includes saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has 30 or fewer carbon atoms in its backbone, e.g., $C_1$-$C_{30}$ for straight chain or $C_3$-$C_{30}$ for branched chain. In certain embodiments, a straight chain or branched chain alkyl has 20 or fewer carbon atoms in its backbone, e.g., $C_1$-$C_{20}$ for straight chain or $C_3$-$C_{20}$ for branched chain, and more preferably 18 or fewer. Likewise, preferred cycloalkyls have from 4-10 carbon atoms in their ring structure, and more preferably have 4-7 carbon atoms in the ring structure. The term "lower alkyl" refers to alkyl groups having from 1 to 6 carbons in the chain, and to cycloalkyls having from 3 to 6 carbons in the ring structure.

Moreover, the term "alkyl" (including "lower alkyl") as used throughout the specification and claims includes both "unsubstituted alkyls" and "substituted alkyls", the latter of which refers to alkyl moieties having substituents replacing a hydrogen on one or more carbons of the hydrocarbon backbone. Such substituents can include, for example, halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, or an aromatic or heteroaromatic moiety. It will be understood by those skilled in the art that the moieties substituted on the hydrocarbon chain can themselves be substituted, if appropriate. Cycloalkyls can be further substituted, e.g., with the substituents described above. An "aralkyl" moiety is an alkyl substituted with an aryl, e.g., having 1 to 3 separate or fused rings and from 6 to about 18 carbon ring atoms, e.g., phenylmethyl (benzyl).

The term "aryl" includes 5- and 6-membered single-ring aromatic groups that may include from zero to four heteroatoms, for example, unsubstituted or substituted benzene, pyrrole, furan, thiophene, imidazole, oxazole, thiazole, triazole, pyrazole, pyridine, pyrazine, pyridazine and pyrimidine, and the like. Aryl groups also include polycyclic fused aromatic groups such as naphthyl, quinolyl, indolyl, and the like. The aromatic ring can be substituted at one or more ring positions with such substituents, e.g., as described above for alkyl groups. Suitable aryl groups include unsubstituted and substituted phenyl groups. The term "aryloxy" as used herein means an aryl group, as defined above, having an oxygen atom attached thereto. The term "aralkoxy" as used herein means an aralkyl group, as defined above, having an oxygen atom attached thereto. Suitable aralkoxy groups have 1 to 3 separate or fused rings and from 6 to about 18 carbon ring atoms, e.g., O-benzyl.

The term "amino," as used herein, refers to an unsubstituted or substituted moiety of the formula —NR$_a$R$_b$, in which R$_a$ and R$_b$ are each independently hydrogen, alkyl, aryl, or heterocyclyl, or R$_a$ and R$_b$, taken together with the nitrogen atom to which they are attached, form a cyclic moiety having from 3 to 8 atoms in the ring. Thus, the term "amino" includes cyclic amino moieties such as piperidinyl or pyrrolidinyl groups, unless otherwise stated. An "amino-substituted amino group" refers to an amino group in which at least one of R$_a$ and R$_b$, is further substituted with an amino group.

Without wishing to be bound by theory, the materials of the invention are believed to have a polymer matrix that is substantially void-free, and which are formed by embedding nanoparticles in gaps between formed or forming polymers. Upon incorporation of the nanoparticles, a matrix embedding individual polymers results, where the matrix is substantially free of voids and defects. As such, an advantageous feature of the present invention involves the ability to impregnate gaps between individual polymers with nanoparticles.

The materials and particles of the instant invention provide for improvements in thermal properties similar to those achieved by mixed bed packings with micro sized particles, but with similar loading capacities as unmodified porous packed bed materials. The materials and particles of the instant invention are distinct from surface metallized particles in that the materials possess similar chromatographic run parameters (i.e., selectivity, retentivity, mobile phase compositions) as silica or hybrid particles without the requirement of significant changes in mobile phase composition or chromatographic run conditions. Additionally, the materials and particles of the instant invention are distinct from hybrid particles that co-condense a soluble metal precursor within a partial condensation reaction with an organofunctional silane or tetraalkoxysilane, in that the nanoparticles are distributed throughout the skeletal wall matrix as individual nanoparticles homogenously or heterogeneously within the polymer network. Moreover, the composites described herein comprising nanoparticles are prepared without the need for the high temperatures ordinarily used to change the crystal structure of nanocomposites. For example $TiO_2$ from metal alkoxide formation is normally amorphous at room temperature. Temperature 300-500° C. can be used to anneal this material and start to form the anatase structure. At temperatures >600° C. a rutile crystal form can start to develop. However, in a typical BCC' hybrid with amorphous $TiO_2$, thermal decomposition of the hybrid group would be observed when heat is used to form anatase or rutile. The same is true for diamonds (formed from very high temperatures, pressures and time, or from explosions) and cubic boronitride. The novel approach described herein, of adding nanoparticles, is the only way of adding these type of materials without degrading the hybrid material.

The thermal property improvement goes to the excellent thermal conduction of certain embodiments of the composites of the present invention, e.g., nanoparticle diamonds. For example, without wishing to be bound by theory, it is believed that diamonds help with thermal transfer from the column to the walls, reducing heat gradients on column that can lower performance of columns with smaller particles or wider column diameters.

In one embodiment, the material, e.g., porous material, is provided by controlling the inorganic or hybrid component content and nanoparticle content of the material. An optimal blend for a particular porous material can depend on the size, viscosity, temperature of the emulsion and/or the presence of other additives such as surfactants or stabilizers. Stabilizers may be added to the emulsion to extend the time of stability and are usually polymers that are soluble in the emulsion and thicken the emulsion. In certain embodiments, the inorganic or hybrid component content of the porous materials of the present invention ranges from about 25% to about 99.999%, depending on the presence of additives. In other embodiments, the inorganic or hybrid component content may range from about 25% to about 50%, or from about 25% to about 35%. In other embodiments, the inorganic or hybrid component content ranges from about 40% to about 85%. In certain embodiments, the inorganic or hybrid component content ranges from about 50% to about 75%. In other embodiments, the inorganic or hybrid component content ranges from about 90% to about 99.9%. In certain embodiments, the inorganic or hybrid component content ranges from about 95% to about 99%. The total amount of nanoparticle may range from about 0.1% by weight to about 20% by weight, preferably from about 1.0% by weight to about 10% by weight, based upon the weight of the porous material.

In certain embodiments, the material of the invention, e.g., prepared by the methods of the invention, having a chromatographically-enhancing pore geometry generally have a specific surface area, as measured by $N_2$ sorption analysis, of about 50 to 800 m²/g, particularly about 75 to 600 m²/g, more particularly about 100 to 200 m²/g. The specific pore volume of the particles is generally about 0.25 to 1.5 cm³/g, particularly about 0.4 to 1.2 cm³/g, more particularly about 0.5 to 1.0 cm³/g. The materials of the invention possessing a chromatographically-enhancing pore geometry have an average pore diameter of generally about 50 to 500 Å, particularly about 60 to 500 Å, more particularly about 100 to 300 Å. The micropore surface area is less than about 110 m²/g, particularly less than about 105 m²/g, more particularly less than about 80 m²/g, and still more particularly less than about 50 m²/g.

III. APPLICATIONS OF THE MATERIALS OF THE INVENTION

The materials of the present invention, among other noted applications, may at least be useful in commercial applications such as packings for chromatography (UPLC, HPLC) columns, chromatographic cartridges, plates or specialized biomolecule separation kits, sequestering reagents, solid supports for combinatorial chemistry, solid supports for oligosaccharide, polypeptides, and/or oligonucleotide synthesis, solid supported biological assays, capillary biological assay devices for mass spectrometry, templates for controlled large pore polymer films, capillary chromatography, electrokinetic pump packing materials, polymer additives, catalyst supports, and packing materials for microchip separation devices.

In particular, the porous material. e.g., particles, have a wide variety of end uses in the separation sciences, such as packing materials for chromatographic columns wherein such columns may have improved stability to alkaline mobile phases and reduced peak tailing for basic analytes, thin layer chromatographic (TLC) plates, solid phase extraction devices, filtration membranes, microtiter plates, scavenger resins, solid phase organic synthesis supports, and the like having a stationary phase which includes porous inorganic/organic hybrid particles having a chromatographically-enhancing pore geometry. The stationary phase may be introduced by packing, coating, impregnation, etc., depending on the requirements of the particular device. In a particular embodiment, the chromatographic device is a packed chromatographic column, such as commonly used in HPLC and UPLC.

As such, one embodiment of the invention provides chromatographic material provided in the invention comprises a composite material, wherein the composite material comprises a nanoparticle dispersed within an inorganic or hybrid material derived from one or more components selected from the group consisting of an organic repeat unit; an organosilyl repeat unit; and an inorganic repeat unit, wherein q is a positive number ranging from 0 to 4. In certain embodiments, the chromatographic material is represented by the following formula $$Np/(A)_w(B)_x(C)_y$$

wherein:

w, x, and y are each independently a positive number ranging from 0 to 1, such that w+x+y=1;

Np represents the nanoparticle;
A represents the organic repeat unit;
B represents the organosilyl repeat unit;
C represents the inorganic repeat unit; and
wherein each repeat unit is covalently bonded to one or more separate repeat units A, B, or C. In particular embodiments, the material is adapted for use in a particular separation device. For example, the material may be adapted for use as a liquid chromatography stationary phase; a sequestering reagent; a solid support for combinatorial chemistry; a solid support for oligosaccharide, polypeptide, or oligonucleotide synthesis; a solid support for a biological assay; a capillary biological assay device for mass spectrometry; a template for a controlled large pore polymer film; a capillary chromatography stationary phase; an electrokinetic pump packing material; a polymer additive; a catalyst; or a packing material for a microchip separation device. In one specific embodiment, the material is adapted for use as an HPLC or UPLC stationary phase.

As such, one embodiment of the invention provides a separations device comprising a material of the invention, e.g., a chromatographic material of the invention. For example, the device may be selected from chromatographic columns, thin layer plates, solid phase extraction devices, filtration membranes, sample cleanup devices, and microtiter plates.

Another embodiment of the invention provides a packed chromatography column containing a material of the invention, e.g., a chromatographic material of the invention, as well as a chromatography system comprising this packed chromatography column.

In another embodiment the invention provides a porous nanocomposite particle, e.g., a particle that is approximately spherical, comprising a within an inorganic or hybrid material derived from one or more components selected from the group consisting of an organic repeat unit; an organosilyl repeat unit; and an inorganic repeat unit, and wherein the material is represented by the following formula

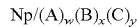

wherein:
w, x, and y are each independently a positive number ranging from 0 to 1, such that w+x+y=1;
q is a positive number ranging from 0 to 4;
Np represents the nanoparticle;
A represents the organic repeat unit;
B represents the organosilyl repeat unit;
C represents the inorganic repeat unit; and
wherein each repeat unit is covalently bonded to one or more separate repeat units A, B, or C. The particles, as noted above, may have particularly advantageous properties, including, but not limited to enhanced pressure tolerance (i.e., possessing a higher mechanical strength) and/or thermally enhanced. In particular embodiments, the particles prepared have higher mechanical strength and do not swell in organic solvents.

In this manner, another embodiment of the invention provides a high-pressure tolerant chromatography particle comprising a composite material, wherein the composite material comprises a nanoparticle within an inorganic or hybrid material derived from one or more components selected from the group consisting of an organic repeat unit; an organosilyl repeat unit; and an inorganic repeat unit, and wherein the particle is capable of substantially retaining pore structure at fluid pressures greater than 15,000 psi, e.g., fluid pressures ranging from about 20,000 psi to about 100,000 psi. As such, in certain embodiments the particle is capable of use in UPLC. Moreover, in an additional embodiment the invention provides an enhanced performance UPLC column, e.g., having an inner diameter of less than 2 microns, packed with these particles. The language "enhanced performance" describes a characteristic of a UPLC column of having improved thermal characteristics at loading capacities that are equal to known mixed bed packed columns useful for UPLC.

In a further embodiment, the invention provides a thermally enhanced chromatography particle comprising a composite material, wherein the composite material comprises a nanoparticle within an inorganic or hybrid material derived from one or more components selected from the group consisting of an organic repeat unit; an organosilyl repeat unit; and an inorganic repeat unit, and wherein the particle is adapted to improve thermal conduction of the composite material. In certain embodiments, the composite material is adapted to substantially retain column efficiency at temperatures greater than 200° C.

The thermally enhanced particles or the high-pressure tolerant particles may, in certain embodiments, comprise particles less than 2 μm in diameter. Moreover, the nanoparticle may be a substance which comprises one or more moieties selected from the group consisting of silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, oxides thereof, and nitrides thereof. In particular embodiments the composite material is represented by the following formula

wherein:
w, x, and y are each independently a positive number ranging from 0 to 1, such that w+x+y=1;
Np represents the nanoparticle;
A represents the organic repeat unit;
B represents the organosilyl repeat unit;
C represents the inorganic repeat unit; and
wherein each repeat unit is covalently bonded to one or more separate repeat units A, B, or C. In additional particular embodiments, the porosity of particle is greater than 0.3 cc/g, e.g., greater than 1.0 cc/g, e.g., ranging from about 1.0 cc/g to 2.0 cc/g. In a specific embodiment, the porosity of particle ranges from 0.3-0.8 cc/g.

In yet another aspect, the invention provides a porous nanocomposite monolith comprising a composite material, wherein the composite material comprises a nanoparticle dispersed within an inorganic or hybrid material derived from one or more components selected from the group consisting of an organic repeat unit; an organosilyl repeat unit; and an inorganic repeat unit. The material may be represented by the following formula

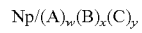

wherein:
w, x, and y are each independently a positive number ranging from 0 to 1, such that w+x+y=1;
Np represents the nanoparticle;
A represents the organic repeat unit;
B represents the organosilyl repeat unit;
C represents the inorganic repeat unit; and
wherein each repeat unit is covalently bonded to one or more separate repeat units A, B, or C.

In yet embodiment, the invention provides a method of separating compounds using chromatography. The method comprises the steps of applying a mixture of compounds to a composite material described herein under appropriate chromatographic conditions, such that one or more compounds in the mixture is separated from the mixture of compounds. Application of the mixture of compounds may be accomplished by any art-recognized technique. In particular embodiments, the mixture of compounds is selected based on the particular separation properties of the composite material used for chromatography, e.g., polarity, hydrophobicity, hydrophilicity, or particular derivatization. In certain embodiments, the method further comprises obtaining the composite material. In certain embodiments, the method further comprises the step of preparing a separations device containing the composite material. In specific embodiments, the mixture of compounds is applied to a separations device comprising the composite material, and such separations device may include, but is not limited to chromatographic columns, thin layer plates, solid phase extraction devices, filtration membranes, sample cleanup devices, and microtiter plates.

Another embodiment of the invention provides a method of performing a separation comprising running a mixture of compounds through a separations device comprising a composite material described herein, such that at least one compound is separated from the mixture. The mixture of compounds may be derived from any source, e.g., biologically or synthetically produced. In certain embodiments, the separated compound is a compound which has been significantly enriched or completely separated. Moreover, the term "running" is an art-recognized term that indicates the process of passing the compound mixture through chromatographic media stationary phase using mobile phase.

An additional embodiment of the invention provides a kit comprising a composite material described herein, and instructions for use in separating a mixture of compounds in a chromatographic method. In certain embodiments, the instructions provide instruction for use of the composite material in a method of separating compounds using chromatography, e.g., as described herein. In particular embodiments, the kit further comprises a separations device.

VI. METHOD OF PREPARATION

In an additional embodiment, the present invention provides methods of preparing a composite materials of the invention. These methods comprise dispersing one or more types of nanoparticles within a polyoligomeric organosiloxane to form a dispersion mixture, and condensing the dispersion mixture hydrolytically, such that a material of the invention is prepared. In certain embodiments, the polyoligomeric organosiloxanes is formed from the partial condensation of one or more components selected from the group consisting of an organic repeat unit; an organosilyl repeat unit; an inorganic repeat unit; and any combination thereof. In particular embodiments, the invention provides a porous material, e.g., particle, which has been synthesized by the hydrolytic condensation of one or more nanoparticles (<20 wt %) dispersed within polyoligomeric organosiloxanes, which is comprised of a partially condensed organofunctional silane, a tetraalkoxysilane, a mixture of two or more organofunctional silanes, or a mixture of one or more organofunctional silanes, with a tetraalkoxysilane, e.g., tetraethoxysilane or tetramethoxysilane. In certain embodiments, the material that is prepared has a chromatographically enhancing pore geometry.

In certain embodiments, the polyoligomeric organosiloxane (POS) is pre-made and the dispersion mixture is prepared by addition of the nanoparticles to the polyoligomeric organosiloxane with agitation of the resulting mixture to form the dispersion mixture, e.g., see Example 3. The agitation may occur by using magnetic mixing, mechanical mixing, rotor-stator mixing, or sonication. Centrifugation or filtration may be used to remove large nanoparticle or aggregated materials.

In certain alternate embodiments, the polyoligomeric organosiloxane is pre-made and the dispersion mixture is prepared by addition of a slurry of the nanoparticles (e.g., wherein the slurry of nanoparticles is selected from the group consisting of an aqueous slurry, an alcohol slurry, an ether slurry, or a combination thereof) to the polyoligomeric organosiloxane with agitation of the resulting mixture to form the dispersion mixture, e.g., see Example 4. In particular embodiments, the cosolvent of the slurry is removed (e.g., water, alcohol or ether solution) by atmospheric or vacuum distillation to produce a Np/POS. In other particular embodiments, the cosolvent is not removed, forming a dispersion of nanoparticles in a POS/cosolvent (e.g., water, alcohol, or ether). The agitation may occur by using magnetic mixing, mechanical mixing, rotor-stator mixing, or sonication. Centrifugation or filtration may be used to remove large nanoparticle or aggregated materials.

In certain additional alternate embodiments, the dispersion mixture is prepared by addition of the nanoparticles to the condensation reaction that forms the polyoligomeric organosiloxane with agitation of the resulting mixture to form the dispersion mixture, e.g., see Example 2. The agitation may occur by using magnetic mixing, mechanical mixing, rotor-stator mixing, or sonication. Centrifugation or filtration may be used to remove large nanoparticle or aggregated materials.

For example, the organic repeat unit is incorporated into the material by reaction of an organic olefin repeat unit selected from the group consisting of divinylbenzene, styrene, vinylbenzylchloride, ethylene glycol dimethacrylate, 1-vinyl-2-pyrrolidinone, N-vinylcaprolactam, tert-butylmethacrylate, acrylamide, methacrylamide, N,N'-(1,2-dihydroxyethylene)bisacrylamide, N,N'-ethylenebisacrylamide, N,N'-methylenebisacrylamide, butyl acrylate, ethyl acrylate, methyl acrylate, 2-(acryloxy)-2-hydroxypropyl methacrylate, 3-(acryloxy)-2-hydroxypropyl methacrylate, trimethylolpropane triacrylate, trimethylolpropane ethoxylate triacrylate, tris[(2-acryloyloxy)ethyl] isocyanurate, acrylonitrile, methacrylonitrile, itaconic acid, methacrylic acid, trimethylsilylmethacrylate, N-[tris(hydroxymethyl) methyl]acrylamide, (3-acrylamidopropyl)trimethylammonium chloride, [3-(methacryloylamino)propyl]dimethyl(3-sulfopropyl)ammonium hydroxide inner salt,

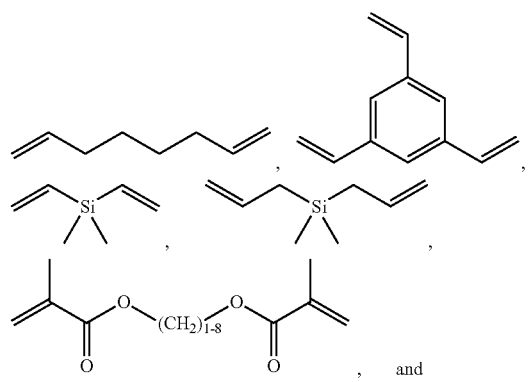, and

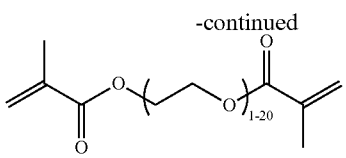

Exemplary organosilyl repeat units that may be used in this approach includes (but is not limited to); bis(triethoxysilyl)ethane; bis(triethoxylsilyl)octane; bis(methyldiethoxysilyl)ethane; bis(triethoxysilyl)ethene; bis(trimethoxysilylethyl)benzene; ethyltriethoxysilane; diethyldiethoxysilane; mercaptopropyltriethoxysilane; methyltriethoxysilane; vinyltriethoxysilane; hexyltriethoxysilane; chloropropyltriethoxysilane; phenylethyltrimethoxysilane; octadecyltrimethoxysilane; octyltrimethoxysilane; 3,3.3-trifluoropropyltrimethoxysilane; and 3-cyanobutyltriethoxysilane. The use of reactive organoalkoxysilanes that have been shown to react by protodesilylation, deprotection, or decompose may also be useful in introducing porosity into hybrid particles. A list of organoalkoxysilanes that may protodesilylate, deprotect or decompose to introduce porosity into hybrid particles includes (but is not limited to); phenyltriethoxysilane; methacryloxypropyltrimethoxysilane; acetyloxyethyltrimethoxysilane, chloroethyltriethoxysilane, and fluorotriethoxysilane. The use of alkene substituted organoalkoxysilanes that may be used in this approach to form both organic bonds (e.g., free radical polymerization) and inorganic siloxane bonds within the particle framework includes (but is not limited to); methacryloxypropyl trimethoxysilane, methacryloxypropyltriethoxysilane, vinyltriethoxysilane, vinyltrimethoxysilane, N-(3-acryloxy-2-hydroxypropyl)-3-aminopropyl triethoxysilane, (3-acryloxypropyl) trimethoxysilane, O-(methacryloxyethyl)-N-(triethoxysilylpropyl)urethane, N-(3-methacryloxy-2-hydroxypropyl)-3-aminopropyl triethoxysilane, methacryloxy methyltriethoxysilane, methacryloxymethyl trimethoxysilane, methacryloxypropy methyldiethoxysilane, methacryloxypropylmethyldimethoxysilane, methacryl oxypropyltris (methoxyethoxy)silane, 3-(N-styrylmethyl-2-aminoethylamino) propyltrimethoxysilane hydrochloride,

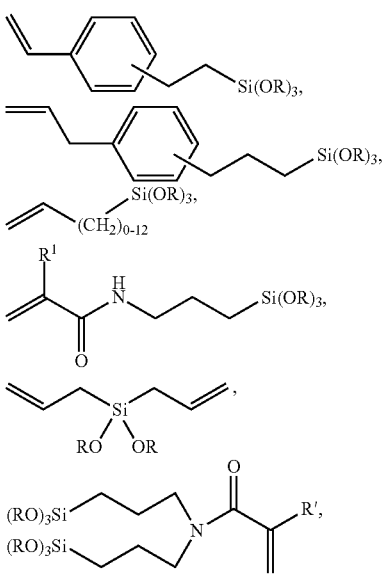

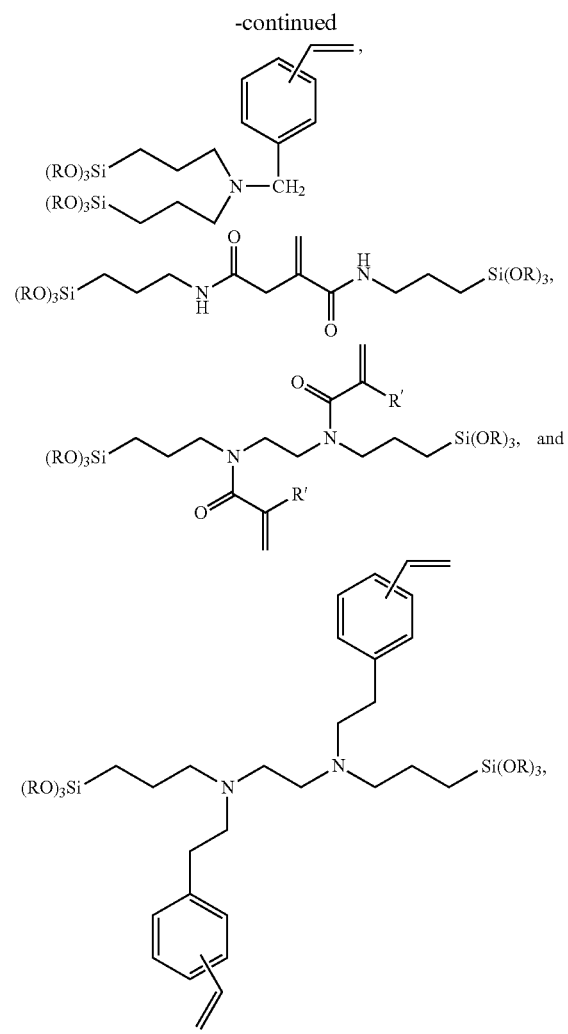

wherein
each R is independently H or a $C_1$-$C_{10}$ alkyl group and wherein R' is independently H or a $C_1$-$C_{10}$ alkyl group. In specific embodiments, each R is independently hydrogen, methyl, ethyl, or propyl. In another specific embodiment, all of the R groups are identical and are selected from the group consisting of hydrogen, methyl, ethyl, or propyl.

Nanoparticles of the present invention may be commercially available or may be prepared using well-known techniques. Nanoparticle formation techniques include chemical and physical vapor deposition; mechanical attrition; gas phase pyrolysis and condensation; electrodeposition; cryochemical synthesis; laser pyrolysis; gel synthesis; and altering of molecular ordering/crystallinity of a material through the use of, for example, hydrothermal or heat treatment. For example, in attrition, macro or micro scale particles are ground in a ball mill, a planetary ball mill, or other size reducing mechanism. The resulting particles are air classified to recover nanoparticles. In pyrolysis, an organic precursor (liquid or gas) is forced through an orifice at high pressure and burned. The resulting ash is air classified to recover oxide nanoparticle.

A thermal plasma can also deliver the energy necessary to cause evaporation of small micrometre size particles. The thermal plasma temperatures are in the order of 10000 K, so that solid powder easily evaporates. Nanoparticles are formed upon cooling while exiting the plasma region. The main types of the thermal plasmas torches used to produce nanoparticles are dc plasma jet, dc arc plasma and radio frequency (RF) induction plasmas. In the arc plasma reactors, the energy necessary for evaporation and reaction is provided by an electric arc which forms between the anode and the cathode. For example, silica sand can be vaporized with an arc plasma at atmospheric pressure. The resulting mixture of plasma gas and silica vapour can be rapidly cooled by quenching with oxygen, thus ensuring the quality of the fumed silica produced. In RF induction plasma torches, energy coupling to the plasma is accomplished through the electromagnetic field generated by the induction coil. The plasma gas does not come in contact with electrodes, thus eliminating possible sources of contamination and allowing the operation of such plasma torches with a wide range of gases including inert, reducing, oxidizing and other corrosive atmospheres. The working frequency is typically between 200 kHz and 40 MHz. Laboratory units run at power levels in the order of 30-50 kW while the large scale industrial units have been tested at power levels up to 1 MW. As the residence time of the injected feed droplets in the plasma is very short it is important that the droplet sizes are small enough in order to obtain complete evaporation. The RF plasma method has been used to synthesize different nanoparticle materials, for example synthesis of various ceramic nanoparticles such as oxides, carbours/carbides and nitrides of Ti and Si.

Moreover, in addition to classification by material, within each material nanoparticles may have a range of identifiable/distinct characteristics. For example, diamond nanoparticles, or nanodiamonds (denoted ND), have also be referred to as synthetic monocrystalline diamonds (SMD), synthetic polycrystalline diamond (SPD), utradisperse diamonds (UDD), ultrananocrystalline diamond (UNCD), ultrafine diamonds (UFD), as well as naturally occurring diamonds. Nanodiamonds may include crystalline and amorphous diamond-like materials. While SMD are prepared using very high temperatures and pressures with the use of metal catalysts. Other types of diamonds (SPD, UDD, UFD) are prepared with the use of high energy explosives, such as trinitrotoluene. Xiangyang Xu, Zhiming Yu, Yongwei Zhu, Baichun Wang, *Diamond & Related Materials,* 14 (2005) 206-212. Nicholas Tumavitch, *R&D Magazine,* 11 (2005) 35. Depending on the synthesis conditions, nanodiamonds can vary in size, clustering, and impurities levels. As a result, different commercial grades of nanodiamond purity exist, as well as different methods for purification (including oxidation employing nitric acid, or the use of strong acid treatments (such as hydrochloric acid)) can be performed. "Ultra Nanocrystalline Diamond: Synthesis, Properties, and Applications", as part of Material Science and Process Technology Series, Edited by Olga A. Shenderova, Dieter M. Gruen, William Andrew Publishing (Norwich, N.Y.), 2006.

Nanodiamonds can be dispersed into solvents by a number of methods, including wet milling, sonication, homogenizers, and rotor stator mixers. The quality and stability of a nanodiamond dispersion is very dependant on the primary or secondary solvent properties, concentration of acids or bases, salt concentrations, surface charge (or zeta-potential) and the use of surfactant stabilizers. Xiangyang Xu, Zhiming Yu, Yongwei Zhu, Baichun Wang, *Diamond & Related Materials,* 14 (2005) 206-212. Masaki Ozawa, Masayasu Inaguma, Makoto Takahashi, Fumiaki Kataoka, Anke Krüger, Eiji Ōsawa, *Advanced Materials,* 19 (2007), 1201-1206.

The surface of nanodiamonds can be modified by a number of different manners. Oxidation, electrochemical methods, surface deposition of metals (e.g., palladium), and surface treatment with ammonia can be used to modify the nanoparticle surface. To create hydrophobic nanodiamonds materials the use of polymeric additives (e.g., polydimethylsiloxane and polyisoprene) or silanization reactions with trimethylsilyl groups with surface active groups (including alcohols, amines or carboxylic acids) can be used. {"Ultra Nanocrystalline Diamond: Synthesis, Properties, and Applications", as part of Material Science and Process Technology Series, Edited by Olga A. Shenderova, Dieter M. Gruen, William Andrew Publishing (Norwich, N.Y.), 2006, pages 371-374.

The hydrolytic condensation may be acid- or base-catalyzed. In particular embodiments, the condensation is acid-catalyzed, e.g., wherein the acid is selected from the group consisting of hydrochloric acid, hydrobromic acid, hydrofluoric acid, hydroiodic acid, sulfuric acid, formic acid, acetic acid, trichloroacetic acid, trifluoroacetic acid, and phosphoric acid. In other particular embodiments, the condensation step is base-catalyzed, e.g., wherein the base is selected from the group consisting of ammonium hydroxide, hydroxide salts of the group I and group II metals, carbonate and hydrogencarbonate salts of the group I metals, and alkoxide salts of the group I and group II metals.

With respect to the condensation reaction, the condensation may be performed in any solvent suitable to allow the condensation to occur in accordance with the invention. Exemplary solvents include but are not limited to water, methanol, ethanol, propanol, isopropanol, butanol, tert-butanol, pentanol, hexanol, cyclohexanol, hexafluoroisopropanol, cyclohexane, petroleum ethers, diethyl ether, dialkyl ethers, tetrahydrofuran, acetonitrile, ethyl acetate, pentane, hexane, heptane, benzene, toluene, xylene, N,N-dimethylformamide, dimethyl sulfoxide, 1-methyl-2-pyrrolidinone, methylene chloride, chloroform, and combinations thereof. Moreover, all of the steps of condensation may be performed in the same reaction vessel.

The pore structure of the material may be modified by further including a surfactant or combination of different surfactants, and by subjecting said material to hydrothermal treatment. Exemplary surfactants or combinations of surfactants may be selected from the group consisting of Triton X-45, Triton X-100, Triton X-165, Triton X-305, TLS, Pluronic F-87, Pluronic P-105, Pluronic P-123, sodium dodecylsulfate (SDS), Triton X-405, tris(hydroxymethyl) aminomethane lauryl sulfate, and combinations thereof. Additionally, the pore structure may be modified by utilizing the further step of addition of a porogen, including but not limited to cyclohexanol, toluene, mesitylene, 2-ethylhexanoic acid, dibutylphthalate, 1-methyl-2-pyrrolidinone, 1-dodecanol, and Triton X-100.

In certain embodiments, the prepolymerization step involves hydrolyzing one or more components in the presence of an acid catalyst, and the content of organoalkoxysilane, tetraalkoxysilane, or nanoparticles (e.g., when present during the prepolymerization step) can be varied. The amount of water used for the hydrolysis can be varied (e.g., from 1.1 to 1.4 mole per mole of the silane). The resulting mixture forms a homogeneous solution, which is stirred and heated to reflux under a flow of an argon or nitrogen. After it is refluxed for a time sufficient to prepolymerize to form polyorganoalkoxysiloxane (POS), e.g., polyalkylalkoxysiloxane, the solvent and the side product, e.g., ethanol, is distilled off from the reaction mixture. Thereafter, the residue is heated at an elevated temperature, e.g., in the range of 45 to 85° C. under an atmosphere of an inert gas, e.g., nitrogen, argon, etc., for a period of time, e.g., 0.5 to 48 h. The residue is further heated at 95° C. to 120° C., e.g., for 1 to 3 h at atmospheric pressure or under reduced pressure, e.g., $10^{-2}$-$10^{-3}$ torr, to remove any volatile species. Alternatively, the nanoparticles may be added after POS formation, with or without additional solvent, and such added solvent (if present) may or may not be removed In particular embodiments, the next step may comprise suspending the POS into fine beads in a solution containing water and an alcohol, such as ethanol or butanol, at 45-65° C. by agitation. The volume percent of alcohol in the solution is varied from 10 to 20%. A surfactant, such as Triton® X-100, Triton® X-165, sodium dodecylsulfate (SDS), ammonia docecylsulfate or TRIS docecylsulfate, is added into the suspension as the suspending agent. Without wishing to be bound by theory, the surfactants, are believed to be able to orient at the hydrophobic/hydrophilic interface between the POS beads and the aqueous phase to stabilize the POS beads. The surfactants may also enhance the concentration of water and the base catalyst on the surface of the POS beads during the gelation step, through their hydrophilic groups, which induces the gelling of the POS beads from the surface towards the center. Use of surfactants to modulate the surface structure of the POS beads may stabilize the shape of the POS beads throughout the gelling process and minimizes or suppresses formation of particles having an irregular shapes, e.g., "shell shaped", and inhomogeneous morphology.

It is also possible to suspend a solution containing POS and a porogen in the aqueous phase, instead of POS alone. The porogen, which is insoluble in the aqueous phase, remains in the POS beads during the gelation step and functions to modify the pore structure. Exemplary porogens include, but are not limited to toluene and mesitylene. By controlling the relative amount of toluene in the POS/toluene solution, the pore volume of the final hybrid particles can be more precisely controlled. This allows the preparation of hybrid particles having large pore volume, e.g., 0.25-1.5 cm³/g.

The gelation step may be initiated by adding a basic catalyst, e.g., ammonium hydroxide, into the POS suspension. Thereafter, the reaction mixture is agitated to drive the reaction to completion. In certain embodiments, the basic catalyst is ammonium hydroxide or sodium hydroxide. The particles are isolated and washed with water. The condensation reaction can be furthered by re-dispersing the formed hybrid particles in an aqueous acid suspension, e.g., hydrochloric acid, at reflux for 1-4 days. The thus-prepared freshmade hybrid particles are filtered and washed with water and methanol free of ammonium ions, then dried.

The methods of preparation of the materials of the present invention may further comprise the step of adding a free radical polymerization initiator. Exemplary free radical polymerization initiators may be selected from the group consisting of 2,2'-azobis-[2-(imidazolin-2-yl)propane] dihydrochloride, 2,2'-azobisisobutyronitrile, 4,4'-azobis(4-cyanovaleric acid), 1,1'-azobis(cyclohexanecarbonitrile), 2,2'-azobis(2-propionamidine) dihydrochloride, 2,2'azobis(2,4-dimethylpentanenitrile), 2,2'-azobis(2-methylbutanenitrile), benzoyl peroxide, 2,2-bis(tert-butylperoxy)butane, 1,1-bis (tert-butylperoxy)cyclohexane, 2,5-bis(tert-butylperoxy)butane,-2,5-dimethylhexane, 2,5-bis(tert-butylperoxy)-2,5-dimethyl-hexyne, bis(1-(tert-butylperoxy)-1-methyethyl) benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene peroxide, cyclohexanone hydroperoxide, dicumyl peroxide, lauroyl peroxide, 2,4-pentanedione peroxide, peracetic acid, and potassium persulfate. Moreover, in particular embodiments, the methods of preparation may further comprise the step of heating following the addition of the free radical polymerization initiator.

In one embodiment, the pore structure of the as-prepared composite material is modified by hydrothermal treatment, which enlarges the openings of the pores as well as the pore diameters, as confirmable by nitrogen ($N_2$) sorption analysis. The hydrothermal treatment may be performed by preparing a slurry containing the as-prepared material and a solution of organic base in water, heating the slurry in an autoclave at an elevated temperature, e.g., 123 to 300° C., for a period of 6 to 48 h. The pH of the slurry can be adjusted to be in the range of 8.0 to 12.5 using concentrated acetic acid. The concentration of the slurry is in the range of 1 g composite material per 5 to 10 ml of the base solution. The thus-treated composite material is filtered, and washed with water and acetone until the pH of the filtrate reaches 7, then dried at 100° C. under reduced pressure for 16 h. The resultant materials may show average pore diameters in the range of 30-1,000 Å. The surface of the hydrothermally treated material may be modified in a similar fashion to that of the material that is not modified by hydrothermal treatment as described in the present invention.

The material obtained upon condensation may be further modified. For example, the methods of preparing the materials of the present invention may further comprise the step of surface modifying the material. Such surface modification may be achieved by the use of a surface modifier selected from the group consisting of an organic group surface modifier, a silanol group surface modifier, a polymeric coating surface modifier, e.g., Sylgard®, and combinations thereof. In certain embodiments, the surface modifier may have the formula $Z_a(R')_b$Si—R, where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R is a functionalizing group. In particular embodiments, R' is selected from the group consisting of methyl, ethyl, propyl, isopropyl, butyl, t-butyl, sec-butyl, pentyl, isopentyl, hexyl and cyclohexyl. In other particular embodiments, the functionalizing group R is selected from the group consisting of alkyl, alkenyl, alkynyl, aryl, cyano, amino, diol, nitro, ester, a cation or anion exchange group, or an alkyl or aryl group containing an embedded polar functionality. In one specific embodiment, the functionalizing group R is a $C_1$-$C_{20}$ alkyl group. Exemplary surface modifiers include, but are not limited to octyltrichlorosilane, octadecyltrichlorosilane, octyldimethylchlorosilane, and octadecyldimethylchlorosilane.

In another embodiment, the organic groups and silanol groups of the material are both surface modified or derivatized. In another embodiment, the particles are surface modified by coating with a polymer. In certain embodiments, surface modification by coating with a polymer is used in conjunction with silanol group modification, organic group modification, or both silanol and organic group modification.

One particular two-step polymeric surface modification of the invention provides a first step of bonding the surface with a silane that has a terminal alkene, epoxide(s) or some other polymerizable group, e.g., methacryloxypropyl silanes. The second step is a polymerization of this surface modified material. For example, bonding the surface with a silane that has a terminal epoxide, a polyvalent nucleophile (such as a polyamine) could be used to accomplish the polymerization; for methacryloxypropyl silane, free radical polymerization of organic monomers may be used, e.g., acrylamide, allylamine, or allylalcohol (either by themselves or in mixtures).

In certain embodiments, the surface of the hydrothermally treated silica contains organic groups, which can be derivatized by reacting with a reagent that is reactive towards the particles' organic group. For example, vinyl groups on the particle can be reacted with a variety of olefin reactive reagents such as bromine ($Br_2$), hydrogen ($H_2$), free radicals, propagating polymer radical centers, dienes, and the like. In another example, hydroxyl groups on the particle can be reacted with a variety of alcohol reactive reagents such as isocyanates, carboxylic acids, carboxylic acid chlorides, and reactive organosilanes as described below. Reactions of this type are well known in the literature, see, e.g., March, J. "Advanced Organic Chemistry," $3^{rd}$ Edition, Wiley, New York, 1985; Odian, G. "The Principles of Polymerization," $2^{nd}$ Edition, Wiley, New York, 1981; the texts of which are incorporated herein by reference.

In addition, the surface of the hydrothermally treated silica also contains silanol groups, which can be derivatized by reacting with a reactive organosilane. The surface derivatization of the hybrid silica is conducted according to standard methods, for example by reaction with octadecyltrichlorosilane or octadecyldimethylchlorosilane in an organic solvent under reflux conditions. An organic solvent such as toluene is typically used for this reaction. An organic base such as pyridine or imidazole is added to the reaction mixture to catalyze the reaction. The product of this reaction is then washed with water, toluene and acetone and dried at 80° C. to 100° C. under reduced pressure for 16 h. The resultant hybrid silica can be further reacted with a short-chain silane such as trimethylchlorosilane to endcap the remaining silanol groups, by using a similar procedure described above.

In another embodiment, porous particles of hybrid silica having a chromatographically-enhancing pore geometry are disclosed, wherein porous hybrid silica particles are formed and the pore structure of the porous particles is modified to form hybrid silica particles having a chromatographically-enhancing pore geometry. In a particular embodiment, the particles are ellipsoidal, e.g., ovoid or spherical, more particularly spherical. In an embodiment, a nanoparticle, an organotrialkoxysilane and a tetraalkoxysilane are prepolymerized to produce a polyalkyloxysiloxane; an aqueous surfactant-containing suspension of the polyalkyloxysiloxane is prepared, and gelling in the presence of a base catalyst is conducted so as to produce porous particles, followed by modifying the pore structure of the porous particles by hydrothermal treatment to produce an intermediate product which advantageously has other uses, and surface modifying the porous particles. In an advantageous embodiment, the prepolymerization step comprises hydrolyzing and condensing a mixture of an organotrialkoxysilane and a tetraalkoxysilane in the presence of an acid catalyst to produce the polyalkyloxysiloxane.

In a particular embodiment, porous spherical particles of hybrid silica may, in a particular embodiment, be prepared by a multi-step process. In the first step, nanoparticles, one or more organoalkoxysilanes such as bis(triethoxysilyl)ethane, and a tetraalkoxysilane such as tetraethoxysilane (TEOS) are prepolymerized to form a polyorganoalkoxysiloxane (POS), e.g., polyalkylalkoxysiloxane, by co-hydrolyzing a mixture of the two or more components in the presence of an acid catalyst (as noted herein, in certain embodiments, nanoparticles may be added to a preformed POS with or without additional solvent, which may or may not be followed by the removal of the additional solvent) In the second step, the POS/nanoparticle is suspended in an aqueous medium in the presence of a surfactant or a combination of surfactants and gelled into porous spherical particles of hybrid silica using a base catalyst. In the third step, the pore structure of the hybrid silica particles is modified by hydrothermal treatment, producing an intermediate hybrid silica product which may be used for particular purposes itself, or desirably may be further processed below. The above three steps of the process allow much better control of the particle sphericity, morphology, pore volume and pore sizes than those described in the prior art, and thus provide the chromatographically-enhancing pore geometry.

As noted above, in certain embodiments of the invention, the surface organic groups of the hybrid silica are derivatized or modified in a subsequent step via formation of an organic covalent bond between the particle's organic group and the modifying reagent. Alternatively, the surface silanol groups of the hybrid silica are derivatized or modified into siloxane functional groups, such as by reacting with an organotrihalosilane, e.g., octadecyltrichlorosilane, or a halopolyorganosilane, e.g., octadecyldimethylchlorosilane, or an alkylaminosilane, e.g., octadecyldimethyl(dimethylamino)silane. Alternatively, the surface organic and silanol groups of the hybrid silica are both derivatized or modified. The surface of the thus-prepared material is then covered by the organic groups, e.g., alkyl, embedded during the gelation and the organic groups added during the derivatization process or processes. The surface coverage by the overall organic groups is higher than in conventional silica-based packing materials, and therefore the surface concentration of the remaining silanol groups in the hybrid silica is smaller. The resulting material, used as a stationary phase for LC, shows excellent peak shape for basic analytes, and better stability to alkaline mobile phases than silica-based packing materials.

Where the prepolymerization step involves co-hydrolyzing a mixture of the two or more components and nanoparticles in an amount less than 20% by weight in the presence of an acid catalyst, the content of the organoalkoxysilane, e.g., organotrialkoxysilane or bis(trialkoxysilyl)organosilane, can be varied, e.g., from about 0.03 to about 1.0 mole per mole, or more preferably, about 0.2 to about 0.5 mole per mole, of the tetraalkoxysilane. The amount of the water used for the hydrolysis can be varied, e.g., from 1.40 to 2.20 mole per mole of the silane. The silane, nanoparticle, water and the ethanol mixture, in the form of a homogeneous solution, is stirred and heated to reflux under a flow of argon. After it is refluxed for a time sufficient to prepolymerize to form polyorganoalkoxysiloxane (POS)/nanoparticle, e.g., polyalkylalkoxysiloxane, the solvent and the side product, mainly ethanol, is distilled off from the reaction mixture. Thereafter, the residue is heated at an elevated temperature, e.g., in the range of 110 to 140° C. under an atmosphere of argon or nitrogen for a period of time, e.g., 1.5 to 16 h. The residue can be further heated at this temperature, e.g., for 1 to 3 h under reduced pressure, e.g., $10^{-2}$-$10^{-3}$ torr, to remove any volatile species.

In the second step, the POS/nanoparticle is suspended into fine droplets in a solution containing water and ethanol at 55° C. by agitation. The volume percent of ethanol in the solution is varied from 10 to 20%. A non-ionic surfactant such as Triton X-100, Triton X-165 or Triton X-45 is added into the suspension as the suspending agent. Alternatively sodium dodecyl sulfate (SDS) or tris(hydroxymethyl)aminomethane lauryl sulfate (TDS) is added into the suspension as an additional suspending agent. The surfactants, e.g., alkylphenoxypolyethoxyethanol, are believed to be able to orient at the hydrophobic/hydrophilic interface between the POS droplets and the aqueous phase to stabilize the POS/nanoparticle droplets. The surfactants are also believed to enhance the concentration of water and the base catalyst on the surface of the POS/nanoparticle droplets during the gelation step, through their hydrophilic groups, which induces the gelling of the POS/nanoparticle droplets from the surface towards the center. Use of surfactants to modulate the surface structure of the POS/nanoparticle droplets stabilizes the shape of the POS/nanoparticle droplets throughout the gelling process, and minimizes or suppresses formation of particles having an irregular shapes, e.g., "shell shaped", and inhomogeneous morphology.

It is also possible to suspend a solution containing POS/nanoparticle and porogen, e.g., toluene or mesitylene, in the aqueous phase, instead of POS/nanoparticle alone. The toluene, which is insoluble in the aqueous phase, remains in the POS/nanoparticle droplets during the gelation step and functions as a porogen. By controlling the relative amount of porogen in the POS/nanoparticle/porogen solution, the pore volume of the final hybrid silica can be more precisely controlled. This allows the preparation of hybrid silica particles having large pore volume, e.g., 0.3-1.6 $cm^3/g$.

The gelation step is initiated by adding the basic catalyst, e.g., ammonium hydroxide into the POS/nanoparticle suspension agitated at 55° C. Thereafter, the reaction mixture is agitated at the same temperature to drive the reaction to completion. In a particular embodiment, ammonium hydroxide may be utilized because bases such as sodium hydroxide are a source of unwanted cations, and ammonium hydroxide is easier to remove in the washing step. The thus-prepared hybrid silica is filtered and washed with water and methanol free of ammonium ions, then dried.

The present invention may also include an additional step of "sizing" the particles or selecting a range of particle size, e.g., for a particular purpose. Any number of well known sizing techniques may be used. Such sizing techniques are described, for example, in W. Gerhartz, et al. (editors) Ullmann's Encyclopedia of Industrial Chemistry, 5th edition, Volume B2: Unit Operations I, VCH Verlagsgesellschaft mbH, (Weinheim, Fed. Rep. Germ. 1988). For example, in certain embodiments particles may be sized to a diameter range of about 0.5 µm to about 300 µm, e.g., about 1 µm to about 20 µm.

In particular embodiments, the invention provides the following additional steps in the method of preparation (or such steps are utilized in the preparing the resulting products): hydrothermal treatment, sizing, acid treatment with bonding or surface modification, or any combination thereof The methods described herein may further comprise one or more of the following steps: obtaining the nanoparticles, obtaining the polyoligomeric organosiloxane, and/or adapting the composite material that is prepared for use in chromatography.

EXAMPLES

The present invention may be further illustrated by the following non-limiting examples describing the preparation of composite materials of the invention, and their use.
Materials All reagents were used as received unless otherwise noted. Those skilled in the art will recognize that equivalents of the following supplies and suppliers exist, and as such the suppliers listed below are not to be construed as limiting.
Characterization Those skilled in the art will recognize that equivalents of the following instruments and suppliers exist, and as such the instruments listed below are not to be construed as limiting.

The % C values were measured by combustion analysis (CE-440 Elemental Analyzer; Exeter Analytical Inc., North Chelmsford, Mass.) or by Coulometric Carbon Analyzer (modules CM5300, CM5014, UIC Inc., Joliet, Ill.). The specific surface areas (SSA), specific pore volumes (SPV) and the average pore diameters (APD) of these materials were measured using the multi-point $N_2$ sorption method (Micromeritics ASAP 2400; Micromeritics Instruments Inc., Norcross, Ga.). The SSA was calculated using the BET method, the SPV was the single point value determined for $P/P_0>0.98$, and the APD was calculated from the desorption leg of the isotherm using the BJH method. The micropore surface area (MSA) was determined as the cumulative adsorption pore diameter data for pores <34 Å subtracted from the specific surface area (SSA). Particle sizes were measured using a Beckman Coulter Multisizer 3 analyzer (30-µm aperture, 70,000 counts). The particle diameter (dp) was measured as the 50% cumulative diameter of the volume based particle size distribution. The width of the distribution was measured as the 90% cumulative volume diameter divided by the 10% cumulative volume diameter (denoted 90/10 ratio). Viscosity was determined for these materials using a Brookfield digital viscometer Model DV-II (Middleboro, Mass.). Measurements of pH were made with a Oakton pH100 Series meter (Cole-Palmer, Vernon Hills, Ill.), and were calibrated using Orion (Thermo Electron, Beverly, Mass.) pH buffered standards at ambient temperature immediately before use. Multinuclear ($^{13}C$, $^{29}Si$) CP-MAS NMR spectra were obtained using a Bruker Instruments Avance-300 spectrometer (7 mm double broadband probe). The spinning speed was typically 5.0-6.5 kHz, recycle delay was 5 sec., and the cross-polarization contact time was 6 msec. Reported $^{13}C$ and $^{29}Si$ CP-MAS NMR spectral shifts were recorded relative to tetramethylsilane using the external standards adamantane ($^{13}C$ CP-MAS NMR, δ 38.55) and hexamethylcyclotrisiloxane ($^{29}Si$ CP-MAS NMR, δ −9.62). Populations of different silicon environments were evaluated by spectral deconvolution using DMFit software. Massiot, D.; Fayon, F.; Capron, M.; King, I.; Le Calve, S.; Alonso, B.; Durand, J.-O.; Bujoli, B.; Gan, Z.; Hoatson, G. *Magn. Reson. Chem.* 2002, 40, 70-76.

Example 1

Synthesis of Polyorganosiloxanes

Following a process described by Jiang et al (U.S. Pat. No. 6,686,035 B2), one or more organoalkoxysilanes or tetraalkoxysilanes (all from Gelest Inc., Morrisville, Pa. or United Chemical Technologies, INC., Bristol, Pa.) were mixed with ethanol (EtOH, anhydrous, J.T. Baker, Phillipsburg, N.J.) in a round bottom flask. An aqueous solution 0.1 N hydrochloric acid (Aldrich, Milwaukee, Wis.) was added drop-wise into the flask. The resulting solution was agitated and refluxed for 16 hours in an atmosphere of argon or nitrogen. Alcohol was removed from the flask by distillation at atmospheric pressure. Residual alcohol and volatile species were removed by heating at 95-120° C. for 1-2 hours in a sweeping stream of argon or nitrogen. The resulting polyorganoalkoxy siloxanes were clear viscous liquids. The chemical formulas are listed in Table 1 for the organoalkoxysilanes or tetraalkoxysilanes used to make a polyethoxylated siloxane polymer (POS). Specific amounts are listed in Table 2 for the starting materials used to prepare these products.

TABLE 1

| Product | Organoalkoxysilane A Chemical Formula | Alkoxysilane B Chemical Formula |
|---|---|---|
| 1a | $(CH_3CH_2O)_3Si(CH_2)_2Si(OCH_2CH_3)_3$ | $Si(OCH_2CH_3)_4$ |
| 1b | $(CH_3CH_2O)_3Si(CH_2)_2Si(OCH_2CH_3)_3$ | — |

TABLE 2

| Product | Organosilane or Organosilane A (g) | Alkoxysilane B (g) | 0.1N HCl (g) | Ethanol (g) | % C | Viscosity (cP) |
|---|---|---|---|---|---|---|
| 1a | 106 | 250 | 40 | 218 | 31.6 | 84 |
| 1b | 519 | 0 | 134 | 653 | 34.7 | 70 |

Example 2

Synthesis of Polyorganosiloxanes Containing Diamond Nanoparticles

Eight hundred and fifty five grams of a 4:1 molar ratio of tetraethoxysilane (TEOS, Gelest Inc., Morrisville, Pa.) and 1,2-bis(triethoxysilyl)ethane (BTEE, Gelest Inc., Morrisville, Pa.) were mixed with 415 grams of ethanol (EtOH, anhydrous, J. T. Baker, Phillipsburg, N.J.) in a round bottom flask. Ninety eight grams of an aqueous solution of 2 wt % diamond nanoparticles (Warren Superabrasives, Saint-Gobain Ceramic Materials, Olyphant, Pa., 5-50 nm) in 0.1 N hydrochloric acid (Aldrich, Milwaukee, Wis.) was prepared separately and was added drop-wise into the flask. The resulting solution was agitated and refluxed for 16 hours in an atmosphere of nitrogen. Alcohol was removed from the flask by distillation at atmospheric pressure. Residual alcohol and volatile species were removed by heating at 110° C. for 1 hour in a sweeping stream of nitrogen. The resulting polyorganoalkoxy siloxane (product 2a) was an opaque mixture (viscosity=54 cP).

Example 3

Addition of Nanoparticles to Polyorganosiloxanes

Diamond nanoparticles (Nanostructured & Amorphous Materials, Inc, Houston, Tex., 4-25 nm), silicon carbide nanoparticles (Sigma-Aldrich, Saint Louis, Mo., <100 nm), or cubic boronitride (BN2600, LANDS Superabrasives, New York, N.Y., 125 nm) were added to a POS prepared in Example 1 that contained 0-15 wt % ethanol (EtOH, anhydrous, J.T. Baker, Phillipsburg, N.J.) or 0-61 wt % mesitylene (Mes; Aldrich, Milwaukee, Wis.), to yield a 0.08-1.00 wt % dispersion. For products 3a-3e the mixture was dispersed using a rotor/stator mixer (Mega Sheer, Charles Ross & Son Co., Hauppauge, N.Y.). For product 3f a sonic probe (Sonics & Materials, Inc., Newtown, Conn.) was used. All products were centrifuged (Thermo EXD, 4×1 L bottle centrifuge, Milford, Mass.) to reduce agglomerates. The resulting products with 0.08-0.62 wt % nanoparticle incorporation were opaque mixtures. Specific amounts are listed in Table 3 for the starting materials used to prepare these products.

TABLE 3

| Product | POS Precursor | POS (Kg) | Ethanol (L) | Mesitylene (g) | Nanoparticle Type | Nanoparticle Mass (g) |
|---|---|---|---|---|---|---|
| 3a | 1a | 9.08 | — | — | Silicon Carbide | 7.57 |
| 3b | 1a | 7.72 | 1.14 | — | Silicon Carbide | 7.57 |
| 3c | 1a | 7.72 | 1.14 | — | Silicon Carbide | 75.7 |
| 3d | 1a | 9.08 | — | — | Silicon Carbide | 7.57 |
| 3e | 1a | 9.08 | — | — | Diamond | 18.60 |
| 3f | 1b | 0.025 | — | 15.53 | Silicon Carbide | 0.2534 |
| 3g | 1a | 0.070 | — | — | cubic-Boronitride | 0.70 |

Example 4

Addition of Nanoparticles to Polyorganosiloxanes

Diamond nanoparticles dispersed in diethylene glycol butyl ether (UDD-K/DIOE, Warren Superabrasives, Saint-Gobain Ceramic Materials, Olyphant, Pa., 5-50 nm), diamond nanoparticles dispersed in ethanol (grade G01, agglomerate free, PlasmaChem GMBH, Berlin, Germany, 4 nm), or titanium dioxide nanoparticles dispersed in ethanol (PlasmaChem GmbH, Berlin, Germany, 15-20 nm) were added to a POS prepared in Example 1a. For products 4a-4d the flask was then heated to distill off ethanol or DIOE. Product 4a required the use of vacuum (0.5 mm Hg) and elevated temperatures (110-150° C.) over 20 hours to remove solvent. Products 4b-4d were obtained under atmospheric conditions (80° C.) within a few hours. For products 4e-4g the ethanol was not removed. The resulting products with 0.5-5 wt % nanoparticle incorporation were opaque mixtures. Specific amounts are listed in Table 4 for the starting materials used to prepare these products.

TABLE 4

| Product | POS Precursor | POS (g) | Nano-dispersion Type | Dispersion (g) |
|---|---|---|---|---|
| 4a | 1a | 100 | 10% Diamonds in DIOE | 25 |
| 4b | 1a | 50 | 10% Diamonds in Ethanol | 26 |
| 4c | 1a | 50 | 10% Diamonds in Ethanol | 13 |
| 4d | 1a | 50 | 10% Diamonds in Ethanol | 5.2 |
| 4e | 1a | 70 | 10% Diamonds in Ethanol | 17.5 |
| 4f | 1a | 317 | 10% Diamonds in Ethanol | 19.0 |
| 4g | 1a | 70 | 5% Titanium Dioxide in Ethanol | 35.0 |

Example 5

Synthesis of Porous Hybrid Fresh-Made Particles a. An aqueous mixture of Triton® X-100, (Dow Chemical, Midland, Mich.), deionized water, and ethanol (EtOH; anhydrous, J.T.Baker, Phillipsburg, N.J.) was added to a round bottom flask. The aqueous solution was heated to 55° C. for 0.5 h. In a separate flask, an oil phase solution was prepared by mixing a mixture from Example 2, 3 or 4 for 0.5 hours with toluene (Tol; Fisher Scientific, Suwanee, Ga.). Under rapid agitation, the oil phase mixture was added into the EtOH/water/X100 mixture and was emulsified with the aqueous phase using a rotor/stator mixer (Model 100L, Charles Ross & Son Co., Hauppauge, N.Y.). Thereafter, 30% ammonium hydroxide (NH$_4$OH; J.T. Baker, Phillipsburg, N.J.) was added into the emulsion. After 20 minutes, the product was transferred to a flask and heated to 55° C. for 17 h. Formed particles in the resulting suspension were isolated by centrifugation (Thermo EXD, 4×1 L bottle centrifuge, Milford, Mass.) or filtration (0.5 µm filter paper) and were washed consecutively with copious amounts of water and acetone. The particles were dried at 80° C. under vacuum for 16 hours. Specific amounts of starting materials used to prepare these products are listed in Table 5. The specific surface areas (SSA), specific pore volumes (SPV) and the average pore diameters (APD) of these materials were measured using the multi-point N$_2$ sorption method and are listed in Table 5.

65° C. for 16 h. After 16 h, the second half of the ammonium hydroxide solution was added and the reaction was mixed for an additional 24 h at 65° C. Formed particles in the resulting suspension were isolated by centrifugation (Thermo EXD, 4×1 L bottle centrifuge, Milford, Mass.) or filtration (0.5 µm filter paper) and were washed by resuspending the particles twice in water. The particles were then dispersed in a 1.0 M HCl solution (8.56 mL per gram particles, dry mass) and were heated to reflux for 2 days. The resulting particles were isolated on 0.5 µm filtration paper and were washed consecutively with copious amounts of water and acetone (HPLC grade, J.T. Baker, Phillipsburgh, N.J.). The particles were dried at 80° C. under vacuum for 16 hours. Specific amounts of starting materials used to prepare these products are listed in Table 5. The % C values, specific surface areas (SSA), specific pore volumes (SPV) and average pore diameters (APD) of these materials are listed in Table 5.

TABLE 5

| Product | Method | Nanoparticle type | Precursor | Precursor (g) | Mes (g) | Tol (g) | Triton X-100 (g) | EtOH (g) | H$_2$O (g) | SDS (g) | NH$_4$OH (mL) | % C | SSA (m$^2$/g) | SPV (cm$^3$/g) | APD (Å) | Estimated nanoparticle Incorporation* (wt %) |
|---|---|---|---|---|---|---|---|---|---|---|---|---|---|---|---|---|
| 5a | a | Diamond | 2a | 58.0 | — | 9.7 | 5.6 | 52.0 | 280 | — | 44 | 7.0 | 577 | 0.67 | 43 | 0.8% |
| 5b | a | Diamond | 2a | 58.0 | — | 9.7 | 5.6 | 52.0 | 280 | — | 44 | 6.7 | 561 | 0.56 | 38 | 0.8% |
| 5c | a | Silicon Carbide | 3d | 58.0 | — | 9.7 | 5.6 | 52.0 | 280 | — | 44 | 6.8 | 613 | 0.68 | 40 | 0.2% |
| 5d | a | Diamond | 3e | 58.0 | — | 9.7 | 5.6 | 52.0 | 280 | — | 44 | 6.8 | 618 | 0.67 | 40 | 0.4% |
| 5e | a | Diamond | 3e | 537.0 | — | 90.0 | 52.0 | 482.0 | 2,590 | — | 407 | 7.3 | 587 | 0.75 | 46 | 0.4% |
| 5f | b | Diamond | 2a | 23.0 | 14.1 | — | 9.3 | 15.0 | 361 | 0.97 | 46 | 6.6 | 416 | 1.13 | 97 | 0.8% |
| 5g | b | Silicon Carbide | 3f | 25.3 | — | — | 7.8 | 12.6 | 303 | 0.82 | 39 | 16.9 | 795 | 0.44 | 28 | 2.0% |
| 5h | a | Diamond | 4a | 58.0 | — | 9.7 | 5.6 | 52.0 | 280 | — | 44 | 6.4 | 644 | 0.66 | 37 | 3.9% |
| 5i | a | Diamond | 2a | 290 | — | 48.6 | 28.0 | 260 | 1400 | — | 220 | 7.12 | 542 | 0.63 | 42 | 0.8% |
| 5j | a | Diamond | 4b | 44.0 | — | 7.4 | 4.2 | 39.4 | 212 | — | 33 | 12.9 | 622 | 0.52 | 33 | 9.3% |
| 5k | a | Diamond | 4c | 44.0 | — | 7.4 | 4.2 | 39.4 | 212 | — | 33 | 9.25 | 581 | 0.55 | 36 | 4.9% |
| 5l | a | Diamond | 4d | 44.0 | — | 7.4 | 4.2 | 39.4 | 212 | — | 33 | 7.74 | 630 | 0.42 | 28 | 2.0% |
| 5m | a | Diamond | 4e | 58.0 | — | 5.0 | 5.6 | 52.0 | 280 | 0.76 | 44 | 7.7 | 645 | 0.47 | 30 | 4.8% |
| 5n | a | Cubic-Boronitride | 3g | 58.0 | — | 9.7 | 5.6 | 52.0 | 280 | 0.76 | 44 | 6.8 | 585 | 0.53 | 34 | 2.0% |
| 5o | a | Titanium Dioxide | 4g | 58.0 | — | 5.0 | 5.6 | 52.0 | 280 | 0.76 | 44 | 5.9 | 539 | 0.44 | 34 | 4.6% |
| 5p | a | Diamond | 4f | 317 | — | 53.0 | 30.6 | 284 | 1,530 | 4.13 | 241 | 6.9 | 607 | 0.60 | 36 | 1.2% |

*Nanoparticle concentration estimated by assuming 100% that was added in Example 1 made it into the particle after complete condensation.

b. An aqueous mixture of Triton® X-100 (X100, Dow Chemical, Midland, Mich.), deionized water, ethanol (EtOH; anhydrous, J.T.Baker, Phillipsburgh, N.J.), and sodium dodecyl sulfate (SDS, Sigma-Aldrich, Saint Louis, Mo.) was added to a round bottom flask. Glycolic acid ethoxylate 4-tert-butylphenylether (GAS, Sigma-Aldrich, Saint Louis, Mo.) was added to adjust the pH to 5.05±0.10. The aqueous solution was then heated to 65° C. for 0.5 h. In a separate flask, an oil phase solution was prepared by mixing a mixture from Example 2 or 3 for 0.5 hours with toluene (Tol, Fisher Scientific, Suwanee, Ga.) or mesitylene (Mes, Aldrich, Milwaukee, Wis.). For product 5 g, since mesitylene was previously added to the precursor mixture 3f, additional porogen was not added. Under rapid agitation, the oil phase solution was added into the EtOH/water/X100/SDS mixture and was emulsified with the aqueous phase using a rotor/stator mixer (Model 100L, Charles Ross & Son Co., Hauppauge, N.Y.). Thereafter, one half of the 30% ammonium hydroxide solution (NH$_4$OH; J.T. Baker, Phillipsburgh, N.J.) was added into the emulsion. After 20 minutes, the product was transferred to a flask and heated to Example 6

Hydrothermal Processing of Porous Fresh-Made Hybrid Particles Containing Nanoparticles Spherical, porous, hybrid particles containing nanoparticles from Examples 5 were mixed with an aqueous solution of 0.3 M tris(hydroxymethyl)aminomethane (TRIS, Aldrich Chemical, Milwaukee, Wis.) at a slurry concentration of 5 mL/g. The pH of the resultant slurry was adjusted to 9.8 using acetic acid (J.T. Baker, Phillipsburgh, N.J.). The slurry was then enclosed in a stainless steel autoclave and heated to 155° C. for 20 hours. After cooling the autoclave to room temperature, the product was filtered and washed thrice using water and twice using methanol (Fisher Scientific, Suwanee, Ga.). The particles were then dried at 80° C. under vacuum for 16 hours. Specific characterization data for these materials are listed in Table 6.

Selected samples were analyzed by Wide Angle X-Ray Powder Diffraction (XRPD) analysis (H&M Analytical Services, Inc. Allentown, N.J.), using a Philips model PW1800 diffractometer (Cu radiation at 40 KV/30 mA). Scans were run over the angular range of 10° to 60° with a step size of 0.05° and a counting time of 32 hours per sample. Under these experimental conditions, the minimum detection level is estimated to be about 0.1%. Sample 6a exhibits evidence of a cubic SiC phase at 0.1% concentration, and sample 6f exhibits evidence of a cubic SiC phase at 1.65% concentration. These values are similar to the estimated SiC incorporation of 0.2% for 6a and 2.0% for 6f. Sample 6j exhibited evidence of a cubic boronitride phase (19 nm). Sample 6k (FIG. 1) exhibited evidence of two polymorphs of $TiO_2$, Anatase (77.5% at 4.8 nm) and Brookite (22.5% at 6.6 nm).

Under these conditions, selected samples containing 0.4-3.9% nano-diamonds (≤50 nm) had no discernable peaks by XRPD. Such a result is not unexpected, considering the low scattering intensity of diamonds (assessed by comparisons of reference intensity ratios) and the expected broadening of diffraction peaks with decreasing particle size (determined by the Scherrer equation, R. Jenkins, R. L. Snyder, Introduction *to X-ray Powder Diffractometry*; John Wiley & Sons, Inc: New York, N.Y., 1996). XRPD simulations of hybrid particles containing nano-diamonds less than 20 nm in size and less than 2% concentration did not have any discernable peaks under these conditions.

TABLE 6

| Product | Precursor | Nanoparticle type | % C | SSA ($m^2/g$) | SPV ($cm^3/g$) | APD (Å) | MSA ($m^2/g$) | Estimated nanoparticle incorporation (wt %) |
|---|---|---|---|---|---|---|---|---|
| 6a | 5c | Silicon Carbide | 6.44 | 160 | 0.64 | 148 | 29 | 0.2% |
| 6b | 5d | Diamond | 6.35 | 170 | 0.64 | 138 | 32 | 0.4% |
| 6c | 5e | Diamond | 6.49 | 187 | 0.70 | 135 | 25 | 0.4% |
| 6d | 5a | Diamond | 6.64 | 161 | 0.64 | 145 | 21 | 0.8% |
| 6e | 5b | Diamond | 6.39 | 153 | 0.52 | 122 | 18 | 0.8% |
| 6f | 5g | Silicon Carbide | 17.1 | 232 | 0.34 | 49 | 77 | 2.0% |
| 6g | 5h | Diamond | 6.71 | 151 | 0.62 | 149 | 19 | 3.9% |
| 6h | 5i | Diamond | 6.72 | 160 | 0.59 | 133 | 12 | 0.8% |
| 6i | 5m | Diamond | 7.90 | 110 | 0.44 | 126 | 14 | 4.8% |
| 6j | 5n | Cubic-Boronitride | 6.50 | 116 | 0.51 | 157 | 9 | 2.0% |
| 6k | 5o | Titanium Dioxide | 6.15 | 70 | 0.31 | 166 | 5 | 4.6% |
| 6l | 5p | Diamond | 6.81 | 120 | 0.57 | 189 | 16 | 1.2% |

Example 7

Acid Treatment of Porous Hybrid Particles Containing Nanoparticles

Figure 2:
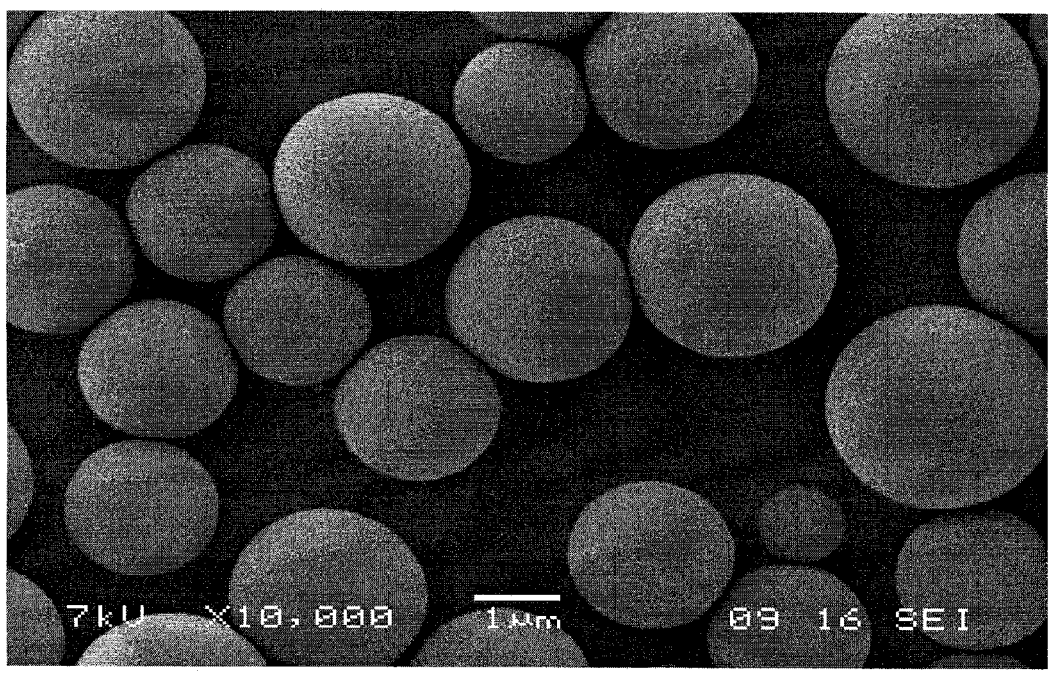
FIG. 2 is an SEM image/characterization of Sample 7a, and indicates the formation of highly spherical particles.

Porous particles prepared according to Examples 6c were sized to 1.8 μm, and were then dispersed in a 1 molar hydrochloric acid solution (Aldrich, Milwaukee, Wis.) for 20 h at 98° C. The particles were then washed with water to a neutral pH, followed by acetone (HPLC grade, J.T. Baker, Phillipsburgh, N.J.). The particles were then dried at 80° C. under vacuum for 16 h. Specific characterization data for these materials are listed in Table 7. SEM characterization of 7a (FIG. 2), indicates the formation of highly spherical particles.

TABLE 7

| Product | Precursor | Nanoparticle type | $dp_{50}$ vol % (μm) | 90/10 ratio | % C | SSA ($m^2/g$) | SPV ($cm^3/g$) | APD (Å) | MSA ($m^2/g$) |
|---|---|---|---|---|---|---|---|---|---|
| 7a | 6c | Diamond | 1.81 | 1.47 | 6.34 | 185 | 0.69 | 135 | 22 |
| 7b | 6h | Diamond | 5.22 | 1.40 | 6.67 | 160 | 0.58 | 132 | 14 |
| 7c | 6l | Diamond | 2.45 | 1.48 | 6.86 | 123 | 0.55 | 164 | 18 |

Example 8

Initial Surface Modification of Porous Hybrid Particles with Chlorosilanes

A sample from Example 7 was modified with octadecyltrichlorosilane (OTCS, Aldrich, Milwaukee, Wis.) using imidazole (Aldrich, Milwaukee, Wis.) in refluxing toluene (HPLC grade, J.T. Baker, Phillipsburgh, N.J.) for 4 hours. The reaction was then cooled and the product was filtered and washed successively with toluene, 1:1 v/v acetone/water and acetone (all solvents from J.T. Baker). The material was then refluxed in an acetone/aqueous 0.12 M ammonium acetate solution (Sigma Chemical Co., St. Louis, Mo.) for 2 hours. The reaction was then cooled and the product was filtered and washed successively with toluene, 1:1 v/v acetone/water and acetone (all solvents from J.T. Baker). The product was then dried at 80° C. under reduced pressure for 16 hours. Reaction data is listed in Table 8. The surface concentration of $C_{18}$-groups was determined to be 3.18 μmol/m² by the difference in particle % C before and after the surface modification as measured by elemental analysis.

TABLE 8

| Product | Precursor | Particles (g) | OTCS (g) | Imidazole (g) | Toluene (mL) | % C | $C_{18}$ Coverage (μmol/m²) |
|---|---|---|---|---|---|---|---|
| 8a | 7a | 18 | 12.92 | 2.72 | 135 | 16.17 | 3.18 |
| 8b | 7b | 10 | 2.48 | 0.87 | 50 | 14.60 | 2.89 |
| 8c | 7c | 15 | 2.79 | 0.98 | 150 | 13.34 | 3.00 |

Example 9

Secondary Surface Modification of Porous Hybrid Particles with Chlorosilanes The surface of the $C_{18}$-bonded hybrid material of Example 8 was further modified with triethylchlorosilane (TECS, Gelest Inc., Morrisville, Pa.) using imidazole (Aldrich, Milwaukee, Wis.) in refluxing toluene for 4 hours. The reaction was then cooled and the product was filtered and washed successively with water, toluene, 1:1 v/v acetone/water and acetone (all solvents from J.T. Baker) and then dried at 80° C. under reduced pressure for 16 hours. The materials were then mixed with hexamethyldisilazane (HMDS, Gelest Inc., Morrisville, Pa.) yielding a slurry (concentration 1.1 g HMDS per 1.0 g particles). The resultant slurry was then enclosed to a stainless steel autoclave and heated at 200° C. for 18 hours. After the autoclave cooled to room temperature the product was isolated on filtration paper and washed successively with water, toluene, 1:1 v/v acetone/water and acetone (all solvents from J.T. Baker) and then dried at 80° C. under reduced pressure for 16 hours. Reaction data are listed in Table 9.

TABLE 9

| Product | Precursor | Particles (g) | TECS (g) | Imidazole (g) | Toluene (mL) | % C |
|---|---|---|---|---|---|---|
| 9a | 8a | 15 | 4.18 | 2.27 | 100 | 17.45 |
| 9b | 8b | 10 | 2.41 | 1.31 | 50 | 15.92 |
| 9c | 8c | 14 | 2.53 | 1.37 | 95 | 14.37 |

Example 10

Chromatographic Evaluation of Surface Modified Porous Hybrid Particles

A sample of surface derivatized porous particles from Example 9 was used for the separation of a mixture of neutral, polar and basic compounds listed in Table 10. The 2.1×100 mm chromatographic columns were packed using a slurry packing technique. The chromatographic system consisted of an ACQUITY UPLC® System and an ACQUITY UPLC® Tunable UV detector. Empower 2 Chromatography Data Software (Build 2154) was used for data collection and analysis. Mobile phase conditions were: 20 mM $K_2HPO_4$/$KH_2PO_4$, pH 7.00±0.02/methanol (36/65 v/v); flow rate: 0.25 mL/min; temperature: 23.4° C.; detection: 254 nm.

It can be seen that the packing materials based on hybrid porous particles containing nanoparticles provide ample retention and resolution in the separation of neutral, polar, and basic compounds. Relative retention is the retention time of the analyte divided by the retention time of acenaphthene. Therefore values less than one, indicate less retention than acenaphthene, and values greater than one, indicate more retention than acenaphthene. (Relative retention is a well known parameter in the field of HPLC.)

The comparable retention factor and relative retentions of the surface derivatized porous particles of the present invention with respect to commercial columns indicates that standard measurements of the utility of the material remain relatively unchanged, while factors such as efficiency and thermal effects are improved.

TABLE 10

| Sample | Retention Factor: Acenaphthene | Relative Retention: | | | | |
|---|---|---|---|---|---|---|
| | | Propranolol/ Acenaphthene | Butylparaben/ Acenaphthene | Naphthalene/ Acenaphthene | Dipropylphthalate/ Acenaphthene | Amitriptyline/ Acenaphthene |
| Product 9a | 13.27 | 0.147 | 0.23 | 0.424 | 0.396 | 1.219 |
| Product 9b | 11.39 | 0.163 | 0.214 | 0.427 | 0.397 | 1.453 |
| Product 9c | 9.32 | 0.153 | 0.229 | 0.424 | 0.400 | 1.318 |
| Commercial <2 μm Hybrid $C_{18}$ Column | 13.67 | 0.132 | 0.222 | 0.420 | 0.403 | 1.240 |
| Commercial <2 μm Silica $C_{18}$ Column | 17.90 | 0.130 | 0.218 | 0.415 | 0.393 | 1.256 |
| Commercial 3.5 μm Silica $C_{18}$ Column | 19.63 | 0.128 | 0.184 | 0.412 | 0.343 | 1.227 |
| Commercial 3.5 μm Silica $C_{18}$ Column | 12.57 | 0.181 | 0.283 | 0.439 | 0.525 | 1.839 |

Example 11

Peak Shape Evaluation of Surface Modified Porous Hybrid Particles

A sample of surface derivatized porous particles from Example 9 were evaluated for USP peak tailing factors using the mobile phase and test conditions of Example 10. The results are shown in Table 11.

Peak tailing factors is a well known parameter in the field of HPLC (a lower value corresponds to reduced tailing). It is evident that the peak tailing factors of Product 9a had comparable basic compound tailing factors of a commercially available hybrid $C_{18}$-column.

The comparable tailing factors of the surface derivatized porous particles of the present invention with respect to commercial columns indicates that standard measurements of the utility of the material remain relatively unchanged, while factors such as efficiency and thermal effects are improved.

TABLE 11

| Sample | Tailing Factor for: | | | | | |
|---|---|---|---|---|---|---|
| | propranolol | butylparaben | naphthalene | dipropylphthalate | acenaphthene | amitriptyline |
| Product 9a | 1.30 | 1.21 | 1.23 | 1.18 | 1.15 | 1.30 |
| Product 9b | 2.48 | 1.61 | 1.09 | 1.11 | 1.16 | 3.19 |
| Product 9c | 2.21 | 1.45 | 1.22 | 1.20 | 1.21 | 1.99 |
| Commercial <2 μm Silica $C_{18}$ Column | 0.81 | 1.13 | 1.05 | 1.11 | 1.02 | 1.41 |
| Commercial <2 μm Hybrid $C_{18}$ Column | 0.76 | 1.03 | 1.05 | 1.01 | 0.97 | 1.03 |
| Commercial 3.5 μm Silica $C_{18}$ Column | 1.37 | 1.15 | 1.07 | 1.08 | 1.03 | 2.01 |
| Commercial 3.5 μm Silica $C_{18}$ Column | 1.12 | 1.22 | 1.17 | 1.21 | 1.13 | 3.89 |

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents are considered to be within the scope of this invention and are covered by the following claims.

What is claimed is:
1. A method of preparing a composite material comprising dispersing one or more types of nanoparticles within a polyoligomeric organosiloxane to form a dispersion mixture, and condensing the dispersion mixture hydrolytically, such that a composite material is prepared, the composite material comprising a nanoparticle dispersed within an inorganic or hybrid material derived from one or more components selected from the group consisting of an organic repeat unit; an organosilyl repeat unit; and an inorganic repeat unit, wherein the composite material is represented by the following formula

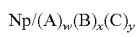

wherein:
w, x, and y are each independently a positive number ranging from 0 to 1, such that w+x+y=1;
Np represents the nanoparticle, the nanoparticle comprising one or more moieties selected from silicon carbide, diamond, cerium, carbon black, carbon nanotubes, aluminum, zirconium, barium, cobalt, copper, europium, gadolinium, iron, nickel, samarium, silver, titanium, zinc, boron, oxides thereof, and nitrides thereof;
A represents the organic repeat unit;
B represents the organosilyl repeat unit;
C represents the inorganic repeat unit; and wherein each repeat unit is covalently bonded to one or more separate repeat units A, B, or C.

2. The method of claim 1, wherein the polyoligomeric organosiloxanes is formed from the partial condensation of one or more components selected from the group consisting of an organic repeat unit; an organosilyl repeat unit; an inorganic repeat unit; and any combination thereof.

3. The method of claim 1, wherein the components are selected from the group consisting of organofunctional silane, a tetraalkoxysilane, a mixture of two or more organofunctional silanes, and a mixture of one or more organofunctional silanes with a tetraalkoxysilane.

4. The method of claim 3, wherein the tetraalkoxysilane is tetraethoxysilane or tetramethoxysilane.

5. The method of claim 1, wherein the organic repeat unit is incorporated into the composite material by reaction of an organic olefin repeat unit selected from the group consisting of divinylbenzene, styrene, vinylbenzylchloride, ethylene glycol dimethacrylate, 1-vinyl-2-pyrrolidinone, N-vinylcaprolactam, tert-butylmethacrylate, acrylamide, methacrylamide, N,N'-(1,2-dihydroxyethylene)bisacrylamide, N,N'-ethylenebisacrylamide, N,N'-methylenebisacrylamide, butyl acrylate, ethyl acrylate, methyl acrylate, 2-(acryloxy)-2-hydroxypropyl methacrylate, 3-(acryloxy)-2-hydroxypropyl methacrylate, trimethylolpropane triacrylate, trimethylolpropane ethoxylate triacrylate, tris[(2-acryloyloxy)ethyl] isocyanurate, acrylonitrile, methacrylonitrile, itaconic acid, methacrylic acid, trimethylsilylmethacrylate, N-[tris(hydroxymethyl) methyl]acrylamide, (3-acrylamidopropyl) trimethylammonium chloride, [3-(methacryloylamino)propyl]dimethyl(3-sulfopropyl)ammonium hydroxide inner salt,

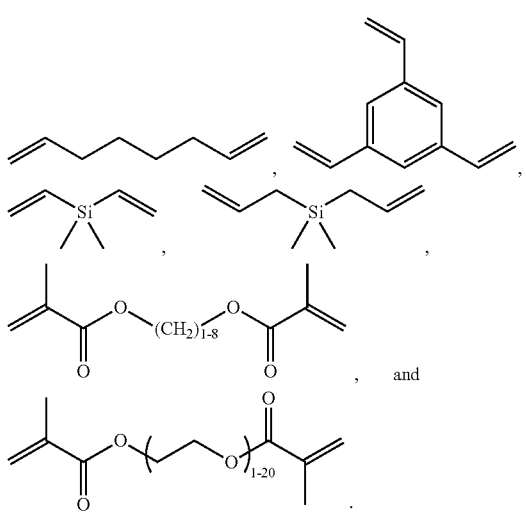

and

6. The method of claim 1, wherein the organosilyl repeat unit is incorporated into the composite material by reaction of a functionalized silane selected from the group consisting of methacryloxypropyl trimethoxysilane, methacryloxypropyltriethoxysilane, vinyltriethoxysilane, vinyltrimethoxysilane, N-(3-acryloxy-2-hydroxypropyl)-3-aminopropyl triethoxysilane, (3-acryloxypropyl) trimethoxysilane, O-(methacryloxyethyl)-N-(triethoxysilylpropyl)urethane, N-(3-methacryloxy-2-hydroxypropyl)-3-aminopropyl triethoxysilane, methacryloxy methyltriethoxysilane, methacryloxymethyl trimethoxysilane, methacryloxypropy methyldiethoxysilane, methacryloxypropylmethyldimethoxysilane, methacryl oxypropyltris (methoxyethoxy)silane, 3-(N-styrylmethyl-2-aminoethylamino) propyltrimethoxysilane hydrochloride,

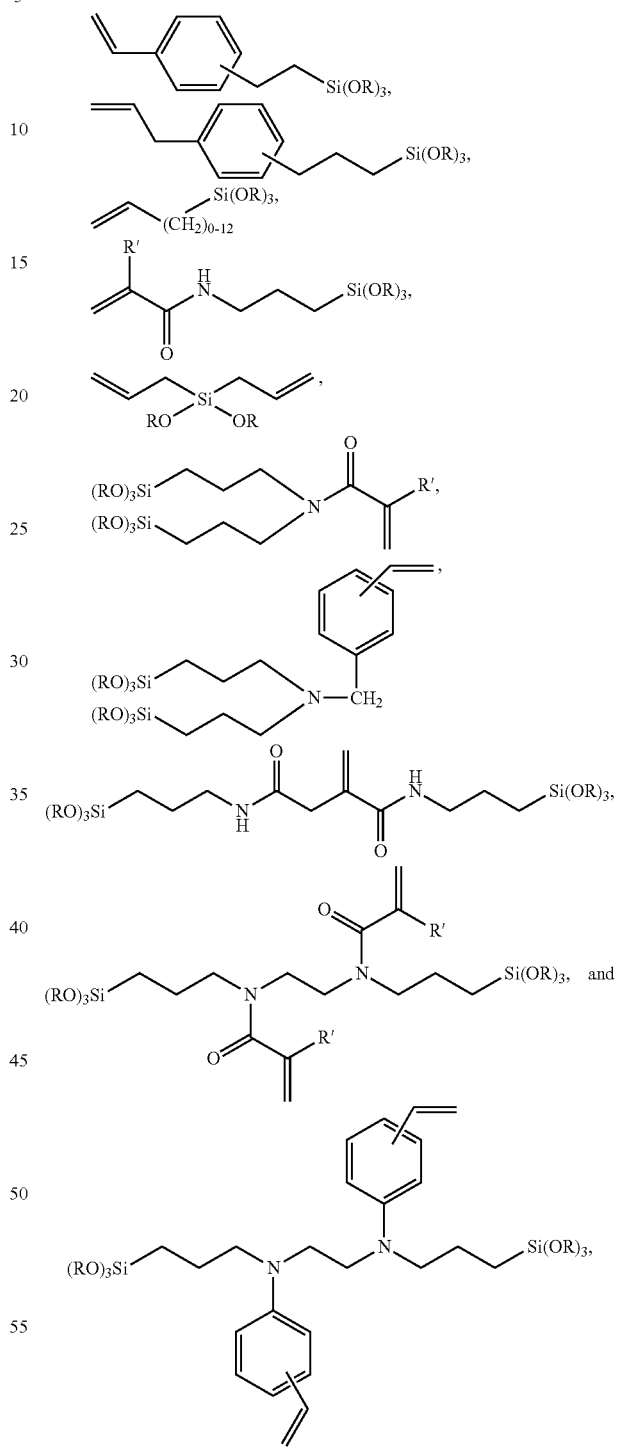

wherein
each R is independently H or a $C_1$-$C_{10}$ alkyl group and
wherein R' is independently H or a $C_1$-$C_{10}$ alkyl group.

7. The method of claim 1, wherein the organosilyl repeat unit is incorporated into the composite material by reaction of a functionalized silane selected from the group consisting

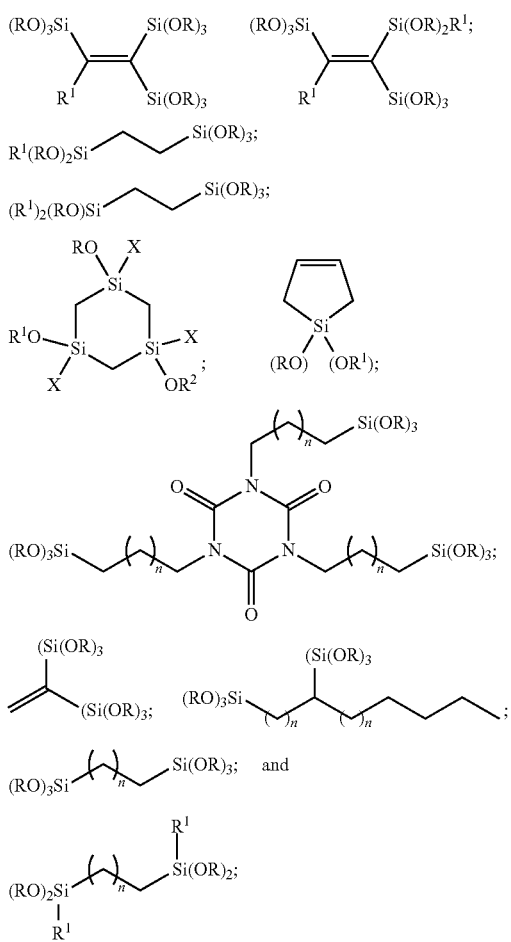

wherein R is $C_1$-$C_{18}$ alkoxy, $C_1$-$C_{18}$ alkyl, or $C_1$-$C_{18}$ alkyl; $R^1$ is $C_1$-$C_{18}$ alkoxy, $C_1$-$C_{18}$ alkyl, or $C_1$-$C_{18}$ alkyl; $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl; X is $C_1$-$C_{18}$ alkoxy or $C_1$-$C_{18}$ alkyl; and n is 1-8.

8. The method of claim 1, wherein the organosilyl repeat unit is incorporated into the composite material by reaction of a functionalized silane selected from the group consisting of bis(triethoxysilyl)ethane; bis(triethoxylsilyl)octane; bis(methyldiethoxysilyl)ethane; bis(triethoxysilyl)ethene; bis(trimethoxysilylethyl)benzene; ethyltriethoxysilane; diethyldiethoxysilane; mercaptopropyltriethoxysilane; methyltriethoxysilane; vinyltriethoxysilane; hexyltriethoxysilane; chloropropyltriethoxysilane; phenylethyltrimethoxysilane; octadecyltrimethoxysilane; octyltrimethoxysilane; 3,3,3-trifluoropropyltrimethoxysilane; 3-cyanobutyltriethoxysilane; phenyltriethoxysilane; acetyloxyethyltrimethoxysilane; chloroethyltriethoxysilane; and fluorotriethoxysilane.

9. The method of claim 1, wherein the organosilyl repeat unit is incorporated into the composite material by reaction of a functionalized silane: (bis(triethoxysilyl)ethane)

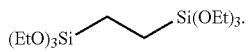

10. The method of claim 1, wherein the inorganic repeat unit is incorporated into the composite material by reaction of an alkoxysilane selected from the group consisting of tetramethoxysilane, tetraethoxysilane, tetrapropoxysilane, and tetrabutoxysilane.

11. The method of claim 1, wherein the tetraalkoxysilane is tetramethoxysilane or tetraethoxysilane.

12. The method of claim 1, wherein the hydrolytic condensation is acid- or base-catalyzed.

13. The method of claim 1, wherein the condensation is performed in a solvent selected from the group consisting of water, methanol, ethanol, propanol, isopropanol, butanol, tert-butanol, pentanol, hexanol, cyclohexanol, hexafluoroisopropanol, cyclohexane, petroleum ethers, diethyl ether, dialkyl ethers, tetrahydrofuran, acetonitrile, ethyl acetate, pentane, hexane, heptane, benzene, toluene, xylene, N,N-dimethylformamide, dimethyl sulfoxide, 1-methyl-2-pyrrolidinone, methylene chloride, chloroform, and combinations thereof.

14. The method of claim 1, wherein the composite material is in the form of particles having an average diameter of 0.1 to 300 µm.

15. The method of claim 1, wherein a pore structure of the composite material is modified by further including a surfactant or combination of different surfactants, and by subjecting said material to hydrothermal treatment.

16. The method of claim 1, further comprising the step of surface modifying the composite material.

17. The method of claim 16, wherein the composite material has been surface modified by a surface modifier selected from the group consisting of an organic group surface modifier, a silanol group surface modifier, a polymeric coating surface modifier, and combinations thereof.

18. The method of claim 16, wherein the composite material has been surface modified with a surface modifier having the formula $Z_a(R')_bSi$—R, where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R is a functionalizing group.

19. The method of claim 17, wherein the composite material has been surface modified by coating with a polymer.

20. The method of claim 17, wherein the composite material has been surface modified by silanol group modification.

21. The method of claim 1, wherein the nanoparticle is selected from diamond, zirconium oxide (amorphous, monoclinic, tetragonal and cubic forms), titanium oxide (amorphous, anatase, brookite and rutile forms), aluminum (amorphous, alpha, and gamma forms), and boronitride (cubic form).

22. The method of claim 1, wherein the nanoparticle is selected from diamond and silicon carbide.

* * * * *